US010349361B2

(12) United States Patent
Feuersaenger et al.

(10) Patent No.: US 10,349,361 B2
(45) Date of Patent: *Jul. 9, 2019

(54) TRANSMIT POWER CONTROL FOR PHYSICAL RANDOM ACCESS CHANNELS

(71) Applicant: Sun Patent Trust, New York, NY (US)

(72) Inventors: Martin Feuersaenger, Bremen (DE); Joachim Loehr, Hessen (DE); Takahisa Aoyama, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/141,829

(22) Filed: Sep. 25, 2018

(65) Prior Publication Data

US 2019/0028980 A1    Jan. 24, 2019

Related U.S. Application Data

(63) Continuation of application No. 15/232,696, filed on Aug. 9, 2016, now Pat. No. 10,117,193, which is a
(Continued)

(30) Foreign Application Priority Data

Apr. 1, 2010 (WO) .................. PCT/EP2010/002119

(51) Int. Cl.
*H04W 52/32*      (2009.01)
*H04W 74/08*      (2009.01)
(Continued)

(52) U.S. Cl.
CPC ....... *H04W 52/325* (2013.01); *H04W 52/281* (2013.01); *H04W 52/327* (2013.01);
(Continued)

(58) Field of Classification Search
CPC ...................................................... H04L 3/12
See application file for complete search history.

(56) References Cited

U.S. PATENT DOCUMENTS 8,660,095 B2    2/2014  Akbar Attar et al.
9,008,050 B2    4/2015  Feuersaenger et al.
(Continued)

FOREIGN PATENT DOCUMENTS

EP    1 986 455 A1    10/2008
EP    2 760 241 A1    7/2014
(Continued)

OTHER PUBLICATIONS

"3rd Generation Partnership Project; Technical Specification Group Radio Access Network; Evolved Universal Terrestrial Radio Access (E-UTRA); Physical layer procedures (Release 8)," Technical Specification, 3GPP TS 36.213 V8.6.0, Mar. 2009, 77 pages.
(Continued)

*Primary Examiner* — Kevin M Cunningham
(74) *Attorney, Agent, or Firm* — Seed IP Law Group LLP

(57) ABSTRACT

The invention relates to methods for adjusting the transmit power utilized by a mobile terminal for uplink transmissions, and to methods for adjusting the transmit power used by a mobile terminal for one or more RACH procedures. The invention is also providing apparatus and system for performing these methods, and computer readable media the instructions of which cause the apparatus and system to perform the methods described herein. In order to allow for adjusting the transmit power of uplink transmissions on uplink component carriers, the invention suggests introducing a power scaling for uplink PRACH transmissions performing RACH procedures on an uplink component carrier. The power scaling is proposed on the basis of a prioritization among multiple uplink transmissions or on the basis of the
(Continued)

uplink component carriers on which RACH procedures are performed.

8 Claims, 13 Drawing Sheets

Related U.S. Application Data continuation of application No. 14/657,891, filed on Mar. 13, 2015, now Pat. No. 9,439,217, which is a continuation of application No. 13/637,607, filed as application No. PCT/EP2011/001658 on Apr. 1, 2011, now Pat. No. 9,008,050.

(51) Int. Cl.
    *H04W 72/04*     (2009.01)
    *H04W 74/00*     (2009.01)
    *H04W 52/34*     (2009.01)
    *H04W 52/28*     (2009.01)
    *H04W 56/00*     (2009.01)
    *H04W 52/14*     (2009.01)

(52) U.S. Cl.
    CPC ..... *H04W 52/346* (2013.01); *H04W 72/0413* (2013.01); *H04W 74/004* (2013.01); *H04W 74/006* (2013.01); *H04W 74/0833* (2013.01); *H04W 52/146* (2013.01); *H04W 52/34* (2013.01); *H04W 56/0045* (2013.01)

(56) References Cited

U.S. PATENT DOCUMENTS

| | | |
|---|---|---|
| 9,439,217 B2 | 9/2016 | Feuersaenger et al. |
| 2007/0019589 A1 | 1/2007 | Attar et al. |
| 2008/0107161 A1 | 5/2008 | Xu et al. |
| 2008/0268893 A1 | 10/2008 | Lee et al. |
| 2010/0041428 A1 | 2/2010 | Chen et al. |
| 2011/0081927 A1 | 4/2011 | Gerstenberger et al. |
| 2011/0103332 A1 | 5/2011 | Kuo |
| 2011/0287804 A1 | 11/2011 | Seo et al. |
| 2012/0188947 A1 | 7/2012 | Larsson et al. |

FOREIGN PATENT DOCUMENTS

| | | |
|---|---|---|
| KR | 10-2009-0083442 A | 8/2009 |
| RU | 2008 106 618 A | 8/2009 |
| WO | 2007/014037 A2 | 2/2007 |
| WO | 2008/042967 A2 | 4/2008 |
| WO | WO 2011/0120716 A1 | 10/2011 |

OTHER PUBLICATIONS

"3rd Generation Partnership Project; Technical Specification Group Radio Access Network; Evolved Universal Terrestrial Radio Access (E-UTRA) Medium Access Control (MAC) protocol specification (Release 8)," Technical Specification 3GPP TS 36.321 V8.5.0, Mar. 2009, 46 pages.

"3rd Generation Partnership Project; Technical Specification Group Radio Access Network; Evolved Universal Terrestrial Radio Access (E-UTRA); Medium Access Control (MAC) protocol specification (Release 8)," Technical Specification 3GPP TS 36.321 V8.9.0, Jun. 2010, 47 pages.

"3rd Generation Partnership Project; Technical Specification Group Radio Access Network; Evolved Universal Terrestrial Radio Access (E-UTRA); Radio Resource Control (RRC); Protocol specification (Release 10)," Technical Specification 3GPP TS 36.331 V10.0.0, Dec. 2010, 276 pages.

Alcatel-Lucent Shanghai Bell, Alcatel-Lucent, "PUSCH Power Control for Carrier Aggregation," R1-093770, Agenda Item: 7.2.5 UL Power Control, 3GPP TSG RAN WG1 Meeting #58bis, Miyazaki, Japan, Oct. 12-16, 2009, 3 pages.

Catt, "Consideration on RACH in CA," R2-101058, Agenda Item 7.1.9, 3GPP TSG RAN WG2 Meeting #69, San Francisco, USA, Feb. 22-26, 2010, 4 pages.

Communication pursuant to Article 94(3) EPC, dated Sep. 17, 2012, for European Application No. 10 712 364.8-2412, 5 pages.

Ericsson, "Carrier aggregation in LTE-Advanced," R1-082468, Agenda Item: 12, TSG-RAN WG1 #53bis, Warsaw, Poland, Jun. 30-Jul. 4, 2008, 6 pages.

Ericsson, ST-Ericsson, "Uplink Power Control for Carrier Aggregation," R1-094274, Agenda Item: 7.2.5, 3GPP TSG RAN WG1 Meeting#58bis, Miyazaki, Japan, Oct. 12-16, 2009, 4 pages.

Extended European Search Report, dated Jun. 27, 2018, for European Application No. 18162253.1-1220, 13 pages.

Extended European Search Report, dated Nov. 27, 2009, for European Application No. 09005727.4-2412, 9 pages.

Extended European Search Report, dated Nov. 27, 2009, for European Application No. 09013642.5-2412, 9 pages.

International Search Report, dated Jun. 7, 2010, for International Application No. PCT/EP2010/002119, 7 pages.

International Search Report, dated Aug. 16, 2011, for International Application No. PCT/EP2011/001658, 6 pages.

LG Electronics Inc., "Logical Channel Prioritization for Aggregated Carriers," R2-094630, Agenda Item: 7.3, 3GPP TSG-RAN2 Meeting #67, Shenzhen, China, Aug. 24-28, 2009, 3 pages.

LG Electronics Inc., "UL RLF," R2-101491, Agenda Item: 7.1.4, 3GPP TSG-RAN2 Meeting #69, San Francisco, USA, Feb. 22-26, 2010, 3 pages.

LG Electronics, Ericsson, Qualcomm, "DRAFT LS on PRACH preamble power offset," R1-083204, 3GPP TSG RAN WG1#54, Jeju, Korea, Aug. 18-22, 2008, 1 page.

Nokia Corporation, Nokia Siemens Networks, "RACH and carrier aggregation," R2-096844, Agenda Item: 7.3.7, 3GPP TSG-RAN WG2 Meeting #68, Jeju, South Korea, Nov. 9-13, 2009, 3 pages.

Russian Federation Decision on Grant dated Mar. 11, 2015, for corresponding RU Application No. 2012141318-07(066598), 8 pages. (W/ English Translation).

Samsung, "UL Transmission Power Control in LTE-A," R1-093395, Agenda Item: 15.4, 3GPP TSG RAN WG1 #58, Shenzhen, China, Aug. 24-28, 2009, 5 pages.

Sesia et al., LTE—The UMTS Long Term Evolution—From Theory to Practice, John Wiley & Sons, Ltd., West Sussex, United Kingdom, 2009, Section 20.2, "Uplink Timing Control," pp. 459-463. (8 pages).

T-Mobile, NTT DoCoMo, Vodafone, Orange, KPN, "Operator requirements and scenarios for UL buffer reporting/scheduling and grant assignment in E-UTRAN," R2-062606, Agenda Item: 11.3.6, 3GPP TSG-RAN WG2#54, Tallinn, Estonia, Aug. 28-Sep. 1, 2006, 2 pages.

ZTE, "Downlink data control structure for LTE-A," R1-084113, Agenda Item: 11.3, 3GPP TSG RAN WG1 Meeting #55, Prague, Czech Republic, Nov. 10-14, 2008, 5 pages.

Canadian Office Action and Search Report, dated Oct. 9, 2018, for corresponding Canadian Application No. 2,793,703, 3 pages.

Ericsson, ST-Ericsson, "On remaining details for uplink power control with carrier aggregation," R1-100846, 3GPP TSG RAN WG1 Meeting #60, Agenda item: 7.1.5, San Francisco, USA, Feb. 22-26, 2010, 4 pages.

Notice of Allowance, dated Mar. 25, 2019, corresponding to Korean Patent Application 10-2018-7017679, 7 pages.

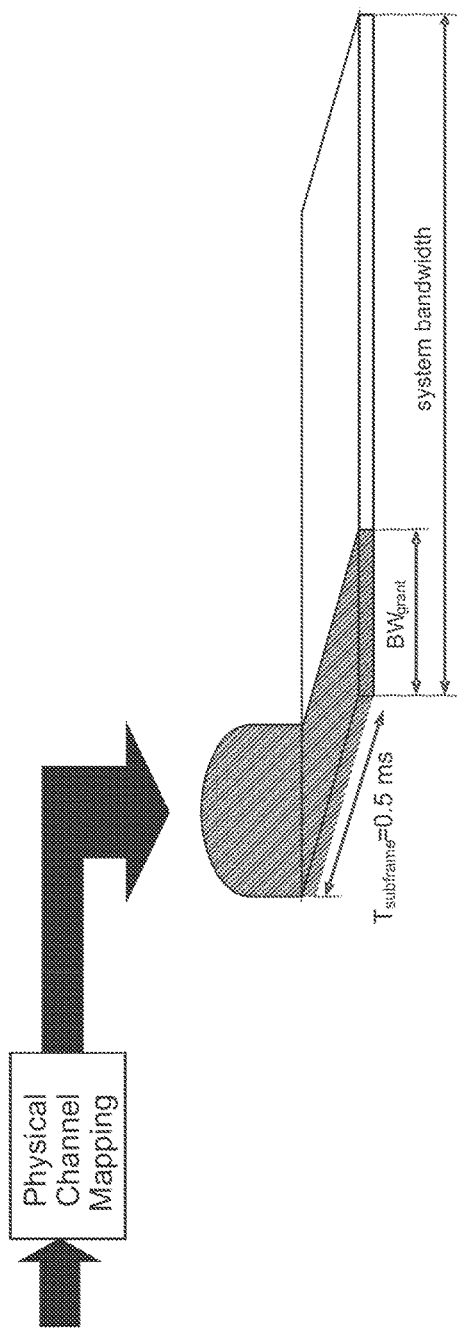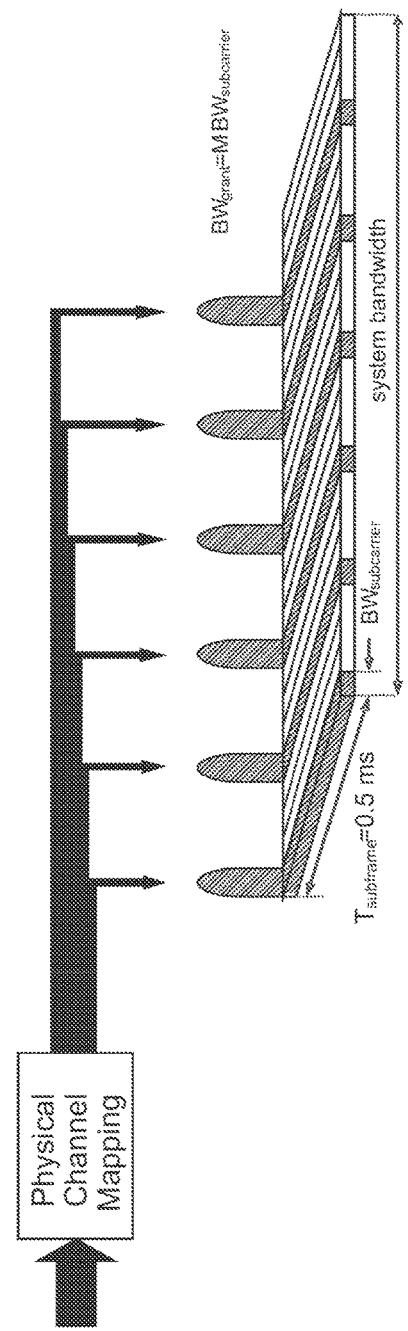

TRANSMIT POWER CONTROL FOR PHYSICAL RANDOM ACCESS CHANNELS

FIELD OF THE INVENTION

The invention relates to methods for controlling the power in the uplink in scenarios where an uplink transmission and a random access preamble, or a multiple random access preambles are transmitted in the same transmission time interval. Furthermore, the invention is also related to the implementation/performance of these methods in/by hardware, i.e. apparatuses, and their implementation in software.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is to be finalized as Release 8 (LTE Rel. 8). The LTE system represents efficient packet-based radio access and radio access networks that provide full IP-based functionalities with low latency and low cost. The detailed system requirements are given in. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in LTE Rel. 8.

LTE Architecture

The overall architecture is shown in FIG. 1 and a more detailed representation of the E-UTRAN architecture is given in FIG. 2. The E-UTRAN consists of eNode B, providing the E-UTRA user plane (PDCP/RLC/MAC/PHY) and control plane (RRC) protocol terminations towards the user equipment (UE). The eNode B (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink QoS, cell information broadcast, ciphering/deciphering of user and control plane data, and compression/decompression of downlink/uplink user plane packet headers. The eNode Bs are interconnected with each other by means of the X2 interface.

The eNode Bs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNode Bs. The SGW routes and forwards user data packets, while also acting as the mobility anchor for the user plane during inter-eNode B handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Uplink Access scheme for LTE

For uplink transmission, power-efficient user-terminal transmission is necessary to maximize coverage. Single-carrier transmission combined with FDMA (Frequency Division Multiple Access) with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA—Orthogonal Frequency Division Multiple Access), and the corresponding improved power-amplifier efficiency and assumed improved coverage (higher data rates for a given terminal peak power). During each time interval, eNode B assigns users a unique time/frequency resource for transmitting user data thereby ensuring intra-cell orthogonality. An orthogonal access in the uplink promises increased spectral efficiency by eliminating intra-cell interference.

Interference due to multipath propagation is handled at the base station (eNode B), aided by insertion of a cyclic prefix in the transmitted signal.

The basic physical resource used for data transmission consists of a frequency resource of size $BW_{grant}$ grant during one time interval, e.g. a sub-frame of 0.5 ms, onto which coded information bits are mapped. It should be noted that a sub-frame, also referred to as transmission time interval (TTI), is the smallest time interval for user data transmission. It is however possible to assign a frequency resource $BW_{grant}$ over a longer time period than one TTI to a user by concatenation of sub-frames.

The frequency resource can either be in a localized or distributed spectrum as illustrated in FIG. 3 and FIG. 4. As can be seen from FIG. 3, localized single-carrier is characterized by the transmitted signal having a continuous spectrum that occupies a part of the total available spectrum. Different symbol rates (corresponding to different data rates) of the transmitted signal imply different bandwidths of a localized single-carrier signal.

On the other hand, as shown in FIG. 4, distributed single-carrier is characterized by the transmitted signal having a non-continuous ("comb-shaped") spectrum that is distributed over system bandwidth. Note that, although the distributed single-carrier signal is distributed over the system bandwidth, the total amount of occupied spectrum is, in essence, the same as that of localized single-carrier. Furthermore, for higher/lower symbol rate, the number of "comb-fingers" is increased/reduced, while the "bandwidth" of each "comb finger" remains the same.

At first glance, the spectrum in FIG. 4 may give the impression of a multi-carrier signal where each comb-finger corresponds to a "sub-carrier". However, from the time-domain signal-generation of a distributed single-carrier signal, it should be clear that what is being generated is a true single-carrier signal with a corresponding low peak-to-average power ratio. The key difference between a distributed single-carrier signal versus a multi-carrier signal, such as e.g. OFDM (Orthogonal Frequency Division Multiplex), is that, in the former case, each "sub-carrier" or "comb finger" does not carry a single modulation symbol. Instead each "comb-finger" carries information about all modulation symbols. This creates a dependency between the different comb-fingers that leads to the low-PAPR characteristics. It is the same dependency between the "comb fingers" that leads to a need for equalization unless the channel is frequency-non-selective over the entire transmission bandwidth. In contrast, for OFDM equalization is not needed as long as the channel is frequency-non-selective over the sub-carrier bandwidth.

Distributed transmission can provide a larger frequency diversity gain than localized transmission, while localized transmission more easily allows for channel-dependent scheduling. Note that, in many cases the scheduling decision may decide to give the whole bandwidth to a single user equipment to achieve high data rates.

Uplink Scheduling Scheme for LTE

The uplink scheme allows for both scheduled access, i.e. controlled by eNodeB, and contention-based access.

In case of scheduled access the user equipment is allocated a certain frequency resource for a certain time (i.e. a time/frequency resource) for uplink data transmission. However, some time/frequency resources can be allocated for contention-based access. Within these time/frequency resources, user equipments can transmit without first being scheduled. One scenario where user equipment is making a contention-based access is for example the random access, i.e. when user equipment is performing initial access to a cell or for requesting uplink resources.

For the scheduled access eNodeB scheduler assigns a user a unique frequency/time resource for uplink data transmission. More specifically the scheduler determines which user equipment(s) that is (are) allowed to transmit, which physical channel resources (frequency), Transport format (Transport Block Size (TBS) and Modulation Coding Scheme (MCS)) to be used by the mobile terminal for transmission The allocation information is signaled to the user equipment via a scheduling grant, sent on the so-called L1/L2 control channel. For simplicity, this downlink channel is referred to the "uplink grant channel" in the following.

A scheduling grant message (also referred to as an resource assignment herein) contains at least information which part of the frequency band the user equipment is allowed to use, the validity period of the grant, and the transport format the user equipment has to use for the upcoming uplink transmission. The shortest validity period is one sub-frame. Additional information may also be included in the grant message, depending on the selected scheme. Only "per user equipment" grants are used to grant the right to transmit on the Uplink Shared Channel UL-SCH (i.e. there are no "per user equipment per RB" grants). Therefore the user equipment needs to distribute the allocated resources among the radio bearers according to some rules, which will be explained in detail in the next section.

Unlike in HSUPA there is no user equipment based transport format selection. The base station (eNodeB) decides the transport format based on some information, e.g. reported scheduling information and QoS information, and user equipment has to follow the selected transport format. In HSUPA eNodeB assigns the maximum uplink resource and user equipment selects accordingly the actual transport format for the data transmissions.

Uplink data transmissions are only allowed to use the time-frequency resources assigned to the user equipment through the scheduling grant. If the user equipment does not have a valid grant, it is not allowed to transmit any uplink data. Unlike in HSUPA, where each user equipment is always allocated a dedicated channel there is only one uplink data channel shared by multiple users (UL-SCH) for data transmissions.

To request resources, the user equipment transmits a resource request message to the eNodeB. This resources request message could for example contain information on the buffer status, the power status of the user equipment and some Quality of Services (QoS) related information. This information, which will be referred to as scheduling information, allows eNodeB to make an appropriate resource allocation. Throughout the document it's assumed that the buffer status is reported for a group of radio bearers. Of course other configurations for the buffer status reporting are also possible. Since the scheduling of radio resources is the most important function in a shared channel access network for determining Quality of Service, there are a number of requirements that should be fulfilled by the uplink scheduling scheme for LTE in order to allow for an efficient QoS management (see 3GPP RAN WG#2 Tdoc. R2-R2-062606, "QoS operator requirements/use cases for services sharing the same bearer", by T-Mobile, NTT DoCoMo, Vodafone, Orange, KPN; available at http://www.3gpp.org/ and incorporated herein by reference):

Starvation of low priority services should be avoided

Clear QoS differentiation for radio bearers/services should be supported by the scheduling scheme The uplink reporting should allow fine granular buffer reports (e.g. per radio bearer or per radio bearer group) in order to allow the eNode B scheduler to identify for which Radio Bearer/service data is to be sent.

It should be possible to make clear QoS differentiation between services of different users It should be possible to provide a minimum bit-rate per radio bearer As can be seen from above list one essential aspect of the LTE scheduling scheme is to provide mechanisms with which the operator can control the partitioning of its aggregate cell capacity between the radio bearers of the different QoS classes. The QoS class of a radio bearer is identified by the QoS profile of the corresponding SAE bearer signaled from serving gateway to eNode B as described before. An operator can then allocate a certain amount of its aggregate cell capacity to the aggregate traffic associated with radio bearers of a certain QoS class.

The main goal of employing this class-based approach is to be able to differentiate the treatment of packets depending on the QoS class they belong to. For example, as the load in a cell increases, it should be possible for an operator to handle this by throttling traffic belonging to a low-priority QoS class. At this stage, the high-priority traffic can still experience a low-loaded situation, since the aggregate resources allocated to this traffic is sufficient to serve it. This should be possible in both uplink and downlink direction.

One benefit of employing this approach is to give the operator full control of the policies that govern the partitioning of the bandwidth. For example, one operator's policy could be to, even at extremely high loads, avoid starvation of traffic belonging to its lowest priority QoS Class. The avoidance of starvation of low priority traffic is one of the main requirements for the uplink scheduling scheme in LTE. In current UMTS Release 6 (HSUPA) scheduling mechanism the absolute prioritization scheme may lead to starvation of low priority applications. E-TFC selection (Enhanced Transport Format Combination selection) is done only in accordance to absolute logical channel priorities, i.e. the transmission of high priority data is maximized, which means that low priority data is possibly starved by high priority data. In order to avoid starvation the eNode B scheduler must have means to control from which radio bearers a user equipment transmits data. This mainly influences the design and use of the scheduling grants transmitted on the L1/L2 control channel in downlink. In the following the details of the uplink rate control procedure in LTE is outlined.

Uplink Rate Control/Logical Channel Prioritization Procedure

For UMTS long term evolution (LTE) uplink transmissions there is a desire that starvation be avoided and greater flexibility in resource assignment between bearers be possible, whilst retaining the per user equipment, rather than per user equipment bearer, resource allocation.

The user equipment has an uplink rate control function which manages the sharing of uplink resources between radio bearers. This uplink rate control function is also referred to as logical channel prioritization procedure in the following. The Logical Channel Prioritization (LCP) procedure is applied when a new transmission is performed, i.e. a transport block needs to be generated. One proposal for assigning capacity has been to assign resources to each bearer, in priority order, until each has received an allocation equivalent to the minimum data rate for that bearer, after which any additional capacity is assigned to bearers in, for example, priority order.

As will become evident from the description of the LCP procedure given below, the implementation of the LCP procedure residing in the user equipment is based on the token bucket model, which is well known in the IP world. The basic functionality of this model is as follows. Periodically and at a given rate, a token which represents the right to transmit a quantity of data is added to the bucket. When the user equipment is granted resources, it is allowed to transmit data up to the amount represented by the number of tokens in the bucket. When transmitting data the user equipment removes the number of tokens equivalent to the quantity of transmitted data. In case the bucket is full, any further tokens are discarded. For the addition of tokens it could be assumed that the period of the repetition of this process would be every TTI, but it could be easily lengthened such that a token is only added every second. Basically instead of every 1 ms a token is added to the bucket, 1000 tokens could be added every second.

In the following the logical channel prioritization procedure used in LTE Rel. 8 is described (see for further details: 3GPP TS 36.321, "Evolved Universal Terrestrial Radio Access (E-UTRA); Medium Access Control (MAC) protocol specification", version 8.5, available at http://www.3gpp.org and incorporated herein by reference).

RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD). The idea behind prioritized bit rate is to support for each bearer, including low priority non-GBR bearers, a minimum bit rate in order to avoid a potential starvation. Each bearer should at least get enough resources in order to achieve the prioritized bit rate (PRB).

The UE shall maintain a variable $B_j$ for each logical channel j. $B_j$ shall be initialized to zero when the related logical channel is established, and incremented by the product PBR×TTI duration for each TTI, where PBR is Prioritized Bit Rate of logical channel j. However, the value of $B_j$ can never exceed the bucket size and if the value of $B_j$ is larger than the bucket size of logical channel j, it shall be set to the bucket size. The bucket size of a logical channel is equal to PBR×BSD, where PBR and BSD are configured by upper layers.

The UE shall perform the following Logical Channel Prioritization procedure when a new transmission is performed. The uplink rate control function ensures that the UE serves its radio bearer(s) in the following sequence:

1. All the logical channel(s) in decreasing priority order up to their configured PBR (according the number of tokens in the bucket which is denoted by $B_j$);

2. If any resources remain, all the logical channels are served in a strict decreasing priority order (regardless of the value of $B_j$) until either the data for that logical channel or the UL grant is exhausted, whichever comes first. Logical channels configured with equal priority should be served equally.

In case the PBRs are all set to zero, the first step is skipped and the logical channel(s) are served in strict priority order: the UE maximizes the transmission of higher priority data.

The UE shall also follow the rules below during the scheduling procedures above:

the UE should not segment an RLC SDU (or partially transmitted SDU or retransmitted RLC PDU) if the whole SDU (or partially transmitted SDU or retransmitted RLC PDU) fits into the remaining resources;

if the UE segments an RLC SDU from the logical channel, it shall maximize the size of the segment to fill the grant as much as possible;

UE should maximize the transmission of data.

Even though for LTE Rel. 8 only a Prioritized Bit Rate (PBR) is used within the LCP procedure there could be also further enhancements in future releases. For example similar to the PBR, also a maximum bit rate (MBR) per GBR bearer and an aggregated maximum bit rate (AMBR) for all Non-GBR bearers could be provided to the user equipment. The MBR denotes bit rates of traffic per bearer while AMBR denotes a bit rate of traffic per group of bearers. AMBR applies to all Non-GBR SAE Bearers of a user equipment. GBR SAE Bearers are outside the scope of AMBR. Multiple SAE Non-GBR bearers can share the same AMBR. That is, each of those SAE bearers could potentially utilize the entire AMBR, e.g. when the other SAE bearers do not carry any traffic. The AMBR limits the aggregated bit rate that can be expected to be provided by the Non-GBR SAE bearers sharing the AMBR.

HARQ Protocol Operation for Unicast Data Transmissions

A common technique for error detection and correction in packet transmission systems over unreliable channels is called hybrid Automatic Repeat request (HARQ). Hybrid ARQ is a combination of Forward Error Correction (FEC) and ARQ.

If a FEC encoded packet is transmitted and the receiver fails to decode the packet correctly (errors are usually checked by a CRC (Cyclic Redundancy Check)), the receiver requests a retransmission of the packet In LTE there are two levels of re-transmissions for providing reliability, namely, HARQ at the MAC layer and outer ARQ at the RLC layer. The outer ARQ is required to handle residual errors that are not corrected by HARQ that is kept simple by the use of a single bit error-feedback mechanism, i.e. ACK/NACK. An N-process stop-and-wait HARQ is employed that has asynchronous re-transmissions in the downlink and synchronous re-transmissions in the uplink. Synchronous HARQ means that the re-transmissions of HARQ blocks occur at pre-defined periodic intervals. Hence, no explicit signaling is required to indicate to the receiver the retransmission schedule. Asynchronous HARQ offers the flexibility of scheduling re-transmissions based on air interface conditions. In this case some identification of the HARQ process needs to be signaled in order to allow for a correct combing and protocol operation. In 3GPP, HARQ operations with eight processes is used in LTE Rel. 8. The HARQ protocol operation for Downlink data transmission will be similar or even identical to HSDPA.

In uplink HARQ protocol operation there are two different options on how to schedule a retransmission. Retransmissions are either scheduled by a NACK, synchronous non-adaptive retransmission, or explicitly scheduled by a PDCCH, synchronous adaptive retransmissions. In case of a synchronous non-adaptive retransmission the retransmission will use the same parameters as the previous uplink transmission, i.e. the retransmission will be signaled on the same physical channel resources respectively uses the same modulation scheme. Since synchronous adaptive retransmissions are explicitly scheduled via PDCCH, the eNode B has the possibility to change certain parameters for the retransmission. A retransmission could be for example scheduled on a different frequency resource in order to avoid fragmentation in the uplink, or the eNode B could change the modulation scheme or alternatively indicate user equipment what redundancy version to use for the retransmission. It should be noted that the HARQ feedback (ACK/NACK) and PDCCH signaling occurs at the same timing. Therefore user equipment only needs to check once whether a synchronous non-adaptive retransmission is triggered, only NACK is received, or whether the eNode B requests a synchronous adaptive retransmission, i.e. PDCCH is signaled.

L1/L2 Control Signaling

In order to inform the scheduled users about their allocation status, transport format and other data related information (e.g. HARQ), L1/L2 control signaling needs to be transmitted on the downlink along with the data. The control signaling needs to be multiplexed with the downlink data in a sub-frame (assuming that the user allocation can change from sub-frame to sub-frame). Here, it should be noted, that user allocation might also be performed on a TTI (Transmission Time Interval) basis, where the TTI length is a multiple of the sub-frames. The TTI length may be fixed in a service area for all users, may be different for different users, or may even by dynamic for each user. Generally, then the L1/2 control signaling needs only be transmitted once per TTI. The L1/L2 control signaling is transmitted on the Physical Downlink Control Channel (PDCCH). It should be noted that assignments for uplink data transmissions, uplink grants, are also transmitted on the PDCCH.

Generally, the PDCCH information sent on the L1/L2 control signaling may be separated into the Shared Control Information (SCI) and Dedicated Control Information (DCI).

Shared Control Information (SCI)

Shared Control Information (SCI) carries so-called Cat 1 information. The SCI part of the L1/L2 control signaling contains information related to the resource allocation (indication). The SCI typically contains the following information:

User identity, indicating the user which is allocated

RB allocation information, indicating the resources (Resource Blocks, RBs) on which a user is allocated. Note, that the number of RBs on which a user is allocated can be dynamic.

Duration of assignment (optional) if an assignment over multiple sub-frames (or TTIs) is possible Depending on the setup of other channels and the setup of the Dedicated Control Information (DCI), the SCI may additionally contain information such as ACK/NACK for uplink transmission, uplink scheduling information, information on the DCI (resource, MCS, etc.).

Dedicated Control Information (DCI)

Dedicated Control Information (DCI) carries the so-called Cat 2/3 information. The DCI part of the L1/L2 control signaling contains information related to the transmission format (Cat 2) of the data transmitted to a scheduled user indicated by Cat 1. Moreover, in case of application of (hybrid) ARQ it carries HARQ (Cat 3) information. The DCI needs only to be decoded by the user scheduled according to Cat 1. The DCI typically contains information on:

Cat 2: Modulation scheme, transport-block (payload) size (or coding rate), MIMO related information, etc. Note, either the transport-block (or payload size) or the code rate can be signaled. In any case these parameters can be calculated from each other by using the modulation scheme information and the resource information (number of allocated RBs).

Cat 3: HARQ related information, e.g. hybrid ARQ process number, redundancy version, retransmission sequence number L1/L2 Control Signaling Information for Downlink Data Transmission Along with the downlink packet data transmission, L1/L2 control signaling is transmitted on a separate physical channel (PDCCH). This L1/L2 control signaling typically contains information on:

The physical channel resource(s) on which the data is transmitted (e.g. subcarriers or subcarrier blocks in case of OFDM, codes in case of CDMA). This information allows the user equipment (receiver) to identify the resources on which the data is transmitted.

The transport Format, which is used for the transmission. This can be the transport block size of the data (payload size, information bits size), the MCS (Modulation and Coding Scheme) level, the Spectral Efficiency, the code rate, etc. This information (usually together with the resource allocation) allows the user equipment (receiver) to identify the information bit size, the modulation scheme and the code rate in order to start the demodulation, the de-rate-matching and the decoding process. In some cases the modulation scheme maybe signaled explicitly.

HARQ information:
  Process number: Allows the user equipment to identify the HARQ process on which the data is mapped.
  Sequence number or new data indicator: Allows the user equipment to identify if the transmission is a new packet or a retransmitted packet.
  Redundancy and/or constellation version: Tells the user equipment, which hybrid ARQ redundancy version is used (required for de-rate-matching) and/or which modulation constellation version is used (required for demodulation)
user equipment Identity (user equipment ID): Tells for which user equipment the L1/L2 control signaling is intended for. In typical implementations this information is used to mask the CRC of the L1/L2 control signaling in order to prevent other user equipments to read this information.

L1/L2 Control Signaling Information for Uplink Data Transmission

To enable an uplink packet data transmission, L1/L2 control signaling is transmitted on the downlink (PDCCH) to tell the user equipment about the transmission details. This L1/L2 control signaling typically contains information on:

The physical channel resource(s) on which the user equipment should transmit the data (e.g. subcarriers or subcarrier blocks in case of OFDM, codes in case of CDMA).

The transport format, the user equipment should use for the transmission.

This can be the transport block size of the data (payload size, information bits size), the MCS (Modulation and Coding Scheme) level, the Spectral Efficiency, the code rate, etc. This information (usually together with the resource allocation) allows the user equipment (transmitter) to pick the information bit size, the modulation scheme and the code rate in order to start the modulation, the rate-matching and the encoding process. In some cases the modulation scheme maybe signaled explicitly.

Hybrid ARQ information:
  Process number: Tells the user equipment from which hybrid ARQ process it should pick the data.
  Sequence number or new data indicator: Tells the user equipment to transmit a new packet or to retransmit a packet.
  Redundancy and/or constellation version: Tells the user equipment, which hybrid ARQ redundancy version to use (required for rate-matching) and/or which modulation constellation version to use (required for modulation).
user equipment Identity (user equipment ID): Tells which user equipment should transmit data. In typical implementations this information is used to mask the CRC of the L1/L2 control signaling in order to prevent other user equipments to read this information.

There are several different flavors how to exactly transmit the information pieces mentioned above. Moreover, the L1/L2 control information may also contain additional information or may omit some of the information. E.g.:

HARQ process number may not be needed in case of a synchronous HARQ protocol.

A redundancy and/or constellation version may not be needed if Chase Combining is used (always the same redundancy and/or constellation version) or if the sequence of redundancy and/or constellation versions is pre defined.

Power control information may be additionally included in the control signaling.

MIMO related control information, such as e.g. precoding, may be additionally included in the control signaling.

In case of multi-codeword MIMO transmission transport format and/or HARQ information for multiple code words may be included.

For uplink resource assignments (PUSCH) signaled on PDCCH in LTE, the L1/L2 control information does not contain a HARQ process number, since a synchronous HARQ protocol is employed for LTE uplink. The HARQ process to be used for an uplink transmission is given by the timing. Furthermore it should be noted that the redundancy version (RV) information is jointly encoded with the transport format information, i.e. the RV info is embedded in the transport format (TF) field. The TF respectively MCS field has for example a size of 5 bits, which corresponds to 32 entries. 3 TF/MCS table entries are reserved for indicating RVs 1, 2 or 3. The remaining MCS table entries are used to signal the MCS level (TBS) implicitly indicating RV0. The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. Three of the entries are reserved to signal an explicit modulation order, providing no Transport format (Transport block) info. For the remaining 29 entries modulation order and Transport block size info are signaled.

Uplink Power Control

Uplink transmission power control in a mobile communication system serves an important purpose: it balances the need for sufficient transmitted energy per bit to achieve the required Quality-of-Service (QoS), against the needs to minimize interference to other users of the system and to maximize the battery life of the mobile terminal. In achieving this purpose, the role of the Power Control (PC) becomes decisive to provide the required SINR (Signal to Interference Noise Ratio) while controlling at the same time the interference caused to neighboring cells. The idea of classic PC schemes in uplink is that all users are received with the same SINR, which is known as full compensation. As an alternative, 3GPP has adopted for LTE the use of Fractional Power Control (FPC). This new functionality makes users with a higher path-loss operate at a lower SINR requirement so that they will more likely generate less interference to neighboring cells.

Detailed power control formulae are specified in LTE for the Physical Uplink Shared Channel (PUSCH), Physical Uplink Control Channel (PUCCH) and the Sounding Reference Signals (SRSs) (see section 5.1 of 3GPP TS 36.213, "Physical layer procedures (Release 8)", version 8.6.0, available at http://www.3gpp.org). The respective power control formula for each of these uplink signals follows the same basic principles. They can be considered as a summation of two main terms: a basic open-loop operating point derived from static or semi-static parameters signaled by the eNodeB, and a dynamic offset updated from sub-frame to sub-frame.

The basic open-loop operating point for the transmit power per resource block depends on a number of factors including the inter-cell interference and cell load. It can be further broken down into two components, a semi-static base level $P_0$, further comprised of a common power level for all user equipments (UEs) in the cell (measured in dBm) and a UE-specific offset, and an open-loop path-loss compensation component. The dynamic offset part of the power per resource block can also be further broken down into two components, a component dependent on the Modulation and Coding Scheme (MCS) and explicit Transmitter Power Control (TPC) commands.

The MCS-dependent component (referred to in the LTE specifications as $\Delta_{TF}$, where TF is short for Transport Format) allows the transmitted power per RB to be adapted according to the transmitted information data rate.

The other component of the dynamic offset is the UE-specific TPC commands. These can operate in two different modes:
  accumulative TPC commands (available for PUSCH, PUCCH and SRS) and
  absolute TPC commands (available for PUSCH only).

For the PUSCH, the switch between these two modes is configured semi-statically for each user equipment by RRC signaling—i.e. the mode cannot be changed dynamically. With the accumulative TPC commands, each TPC command signals a power step relative to the previous level.

Formula (1) below shows the user equipment transmit power in dBm for the PUSCH:

$$P_{PUSCH}=\min[P_{MAX}, 10\cdot\log_{10}M+P_{0\_PUSCH}+\alpha\cdot PL+\Delta_{MCS}+f(\Delta_i)] \quad (1)$$

where:
  $P_{MAX}$ is the maximum available transmit power of the user equipment, which is depending on the user equipment class and configuration by the network
  M is the number of allocated physical resource blocks (PRBs).
  PL is the user equipment path loss derived at the UE-based on RSRP (Reference Signal Received Power) measurement and signaled RS (Reference Symbol) eNodeB transmission power.
  $\Delta_{MCS}$ is an MCS-dependent power offset set by the eNodeB.
  $P_{0\_PUSCH}$ is a UE-specific parameter (partially broadcasted and partially signaled using RRC).
  $\alpha$ is cell-specific parameter (broadcasted on BCH).
  $\Delta_i$ are closed loop PC commands signaled from the eNodeB to the user equipment
  function f( ) indicates whether closed loop commands are relative accumulative or absolute. The function f( ) is signaled to the user equipment via higher layers.

Further Advancements for LTE (LTE-A)

The frequency spectrum for IMT-Advanced was decided at the World Radiocommunication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g. to fulfill the requirements on IMT-Advanced. Two major technology components which are currently under consideration for LTE-Advanced (LTE-A for short) are described in the following.

LTE-A Support of Wider Bandwidth

Carrier aggregation, where two or more component carriers are aggregated, is considered for LTE-A in order to support wider transmission bandwidths e.g. up to 100 MHz and for spectrum aggregation.

A terminal may simultaneously receive or transmit on one or multiple component carriers depending on its capabilities:
  An LTE-A terminal with reception and/or transmission capabilities for carrier aggregation can simultaneously receive and/or transmit on multiple component carriers. There is one Transport Block (in absence of spatial multiplexing) and one HARQ entity per component carrier.
  An LTE Rel. 8 terminal can receive and transmit on a single component carrier only, provided that the structure of the component carrier follows the Rel. 8 specifications.

It shall be possible to configure all component carriers LTE Rel. 8 compatible, at least when the aggregated numbers of component carriers in the uplink and the downlink are same. Consideration of non-backward-compatible configurations of LTE-A component carriers is not precluded At present, LTE-A supports carrier aggregation for both contiguous and non-contiguous component carriers with each component carrier limited to a maximum of 110 Resource Blocks (RBs) in the frequency domain, using the LTE Rel. 8 numerology. It is possible to configure a user equipment to aggregate a different number of component carriers originating from the same eNodeB. Please note that component carriers originating from the same eNodeB do no necessarily need to provide the same coverage.

Furthermore, a user equipment may be configured with different bandwidths in the uplink and the downlink:
  The number of downlink component carriers that can be configured depends on the downlink aggregation capability of the user equipment;
  The number of uplink component carriers that can be configured depends on the uplink aggregation capability of the user equipment;
  It is not possible to configure a user equipment with more uplink component carriers than downlink component carriers;
  In typical TDD deployments, the number of component carriers and the bandwidth of each component carrier in uplink and downlink is the same.

The spacing between centre frequencies of contiguously aggregated component carriers is a multiple of 300 kHz. This is in order to be compatible with the 100 kHz frequency raster of LTE Rel. 8 and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For uplink and for downlink there is one HARQ entity required in MAC for each aggregated component carrier. There is (in the absence of Single User—Multiple Input Multiple Output (SU-MIMO) for uplink) at most one transport block per component carrier. A transport block and its potential HARQ retransmissions need to be mapped on the same component carrier. The Layer 2 structure with configured carrier aggregation is shown in FIG. 5 and FIG. 6 for the downlink and uplink respectively.

When carrier aggregation is configured, the user equipment has only one RRC connection with the network. At RRC connection establishment/re-establishment, one cell provides the security input (one ECGI, one PCI and one ARFCN) and the non-access stratum (NAS) mobility information (e.g. tracking area identifier (TAI)), similar to LTE Rel. 8. After RRC connection establishment/re-establishment, the component carrier corresponding to that cell is referred to as the Downlink Primary Component Carrier (DL PCC) in the downlink. There is always only one DL PCC and one UL PCC configured per user equipment in connected mode. Within the configured set of component carriers, other component carriers are referred to as Secondary Component Carriers (SCCs).

The characteristics of the DL PCC and UL PCC are:
The UL PCC is used for transmission of Layer 1 (L1) uplink control information;
The DL PCC cannot be de-activated;
Re-establishment of the DL PCC is triggered when the DL PCC experiences Radio Link Failure (RLF), but not when DL SCCs experience RLF;
The DL PCC cell can change with handover;
NAS information is taken from the DL PCC cell.

The reconfiguration, addition and removal of component carriers can be performed by RRC signaling. At intra-LTE handover, RRC can also add, remove, or reconfigure component carriers for usage in the target cell. When adding a new component carrier, dedicated RRC signaling is used for sending component carrier's system information which is necessary for component carrier transmission/reception (similarly as in LTE Rel.8 for handover).

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats (called "CIF"). A linking between uplink and downlink component carriers allows identifying the uplink component carrier for which the grant applies when there is no-cross-carrier scheduling. The linkage of downlink component carriers to uplink component carriers does not necessarily need to be one to one. In other words, more than one downlink component carrier can link to the same uplink component carrier. At the same time, a downlink component carrier can only link to one uplink component carrier.

(De)Activation of a Component Carrier and DRX Operation

In carrier aggregation, whenever a user equipment is configured with only one component carrier, LTE Rel. 8 DRX operation applies. In other cases, the same DRX operation applies to all configured and activated component carriers (i.e. identical active time for PDCCH monitoring).

When in active time, any component carrier may always schedule PDSCH on any other configured and activated component carrier.

To enable reasonable UE battery consumption when carrier aggregation is configured, a component carrier activation/deactivation mechanism for downlink SCCs is introduced (i.e. activation/deactivation does not apply to the PCC). When a downlink SCC is not active, the UE does not need to receive the corresponding PDCCH or PDSCH, nor is it required to perform CQI measurements. Conversely, when a downlink SCC is active, the user equipment should receive the PDSCH and PDCCH (if present), and is expected to be able to perform CQI measurements. In the uplink however, a user equipment is always required to be able to transmit on the PUSCH on any configured uplink component carrier when scheduled on the corresponding PDCCH (i.e. there is no explicit activation of uplink component carriers).

Other details of the activation/deactivation mechanism for SCCs are:
Explicit activation of DL SCCs is done by MAC signaling;
Explicit deactivation of DL SCCs is done by MAC signaling;
Implicit deactivation of DL SCCs is also possible;
DL SCCs can be activated and deactivated individually, and a single activation/deactivation command can activate/deactivate a subset of the configured DL SCCs;
SCCs added to the set of configured CCs are initially "deactivated".

Timing Advance

As already mentioned above, for the uplink transmission scheme of 3GPP LTE single-carrier frequency division multiple access (SC-FDMA) was chosen to achieve an orthogonal multiple-access in time and frequency between the different user equipments transmitting in the uplink.

Uplink orthogonality is maintained by ensuring that the transmissions from different user equipments in a cell are time-aligned at the receiver of the eNodeB. This avoids intra-cell interference occurring, both between user equipments assigned to transmit in consecutive sub-frames and between user equipments transmitting on adjacent subcarriers. Time alignment of the uplink transmissions is achieved by applying a timing advance at the user equipment's transmitter, relative to the received downlink timing as exemplified in FIG. 7. The main role of this is to counteract differing propagation delays between different user equipments.

Initial Timing Advance Procedure

When user equipment is synchronized to the downlink transmissions received from eNodeB, the initial timing advance is set by means of the random access procedure as described below. The user equipment transmits a random access preamble based on which the eNodeB can estimate the uplink timing. The eNodeB responds with an 11-bit initial timing advance command contained within the Random Access Response (RAR) message. This allows the timing advance to be configured by the eNodeB with a granularity of 0.52 μs from 0 up to a maximum of 0.67 ms.

Additional information on the control of the uplink timing and timing advance on 3GPP LTE (Release 8/9) can be found in chapter 20.2 of Stefania Sesia, Issam Toufik and Matthew Baker, "LTE—The UMTS Long Term Evolution: From Theory to Practice", John Wiley & Sons, Ltd. 2009, which is incorporated herein by reference.

Updates of the Timing Advance

Once the timing advance has been first set for each user equipment, the timing advance is updated from time to time to counteract changes in the arrival time of the uplink signals at the eNodeB. In deriving the timing advance update commands, the eNodeB may measure any uplink signal which is useful. The details of the uplink timing measurements at the eNodeB are not specified, but left to the implementation of the eNodeB.

The timing advance update commands are generated at the Medium Access Control (MAC) layer in the eNodeB and transmitted to the user equipment as MAC control elements which may be multiplexed together with data on the Physical Downlink Shared Channel (PDSCH). Like the initial timing advance command in the response to the Random Access Channel (RACH) preamble, the update commands have a granularity of 0.52 μs. The range of the update commands is ±16 μs, allowing a step change in uplink timing equivalent to the length of the extended cyclic prefix. They would typically not be sent more frequently than about every 2 seconds. In practice, fast updates are unlikely to be necessary, as even for a user equipment moving at 500 km/h the change in round-trip path length is not more than 278 m/s, corresponding to a change in round-trip time of 0.93 μs/s.

The eNodeB balances the overhead of sending regular timing update commands to all the UEs in the cell against a UE's ability to transmit quickly when data arrives in its transmit buffer. The eNodeB therefore configures a timer for each user equipment, which the user equipment restarts each time a timing advance update is received. In case the user equipment does not receive another timing advance update before the timer expires, it must then consider that it has lost uplink synchronization (see also section 5.2 of 3GPP TS 36.321, "Evolved Universal Terrestrial Radio Access (E-UTRA); Medium Access Control (MAC) protocol specification", version 8.9.0, available at http://www.3gpp.org and incorporated herein by reference).

In such a case, in order to avoid the risk of generating interference to uplink transmissions from other user equipments, the UE is not permitted to make another uplink transmission of any sort and needs to revert to the initial timing alignment procedure in order to restore the uplink timing.

Random Access Procedure

A mobile terminal in LTE can only be scheduled for uplink transmission, if its uplink transmission is time synchronized. Therefore the Random Access (RACH) procedure plays an important role as an interface between non-synchronized mobile terminals (UEs) and the orthogonal transmission of the uplink radio access.

Essentially the Random Access in LTE is used to achieve uplink time synchronization for a user equipment which either has not yet acquired, or has lost, its uplink synchronization. Once a user equipment has achieved uplink synchronization the eNodeB can schedule uplink transmission resources for it. The following scenarios are therefore relevant for random access:

A user equipment in RRC_CONNECTED state, but not uplink-synchronized, wishing to send new uplink data or control information A user equipment in RRC_CONNECTED state, but not uplink-synchronized, required to receive downlink data, and therefore to transmit corresponding HARQ feedback, i.e. ACK/NACK, in the uplink. This scenario is also referred to as Downlink data arrival A user equipment in RRC_CONNECTED state, handing over from its current serving cell to a new target cell; in order to achieve uplink time-synchronization in the target cell Random Access procedure is performed A transition from RRC_IDLE state to RRC_CONNECTED, for example for initial access or tracking area updates Recovering from radio link failure, i.e. RRC connection re-establishment There is one more additional case, where user equipment performs random access procedure, even though user equipment is time-synchronized. In this scenario the user equipment uses the random access procedure in order to send a scheduling request, i.e. uplink buffer status report, to its eNodeB, in case it does not have any other uplink resource allocated in which to send the scheduling request, i.e. dedicated scheduling request (D-SR) channel is not configured.

LTE offers two types of random access procedures that allow access to be either contention based, i.e. implying an inherent risk of collision, or contention-free (non-contention based). It should be noted that contention-based random access can be applied for all six scenarios listed above, whereas a non-contention based random access procedure can only be applied for the downlink data arrival and handover scenario.

In the following the contention based random access procedure is being described in more detail with respect to FIG. 8. A detailed description of the random access procedure can be also found in 3GPP 36.321, section 5.1.

FIG. 8 shows the contention based RACH procedure of LTE. This procedure consists of four "steps". First, the user equipment transmits 801 a random access preamble on the Physical Random Access Channel (PRACH) to the eNodeB. The preamble is selected by user equipment from the set of available random access preambles reserved by eNodeB for contention based access. In LTE, there are 64 preambles per cell which can be used for contention-free as well as contention based random access. The set of contention based preambles can be further subdivided into two groups, so that the choice of preamble can carry one bit of information to indicate information relating to the amount of transmission resources needed to transmit for the first scheduled transmission, which is referred to as msg3 in TS36.321 (see step 703). The system information broadcasted in the cell contain the information which signatures (preambles) are in each of the two subgroups as well as the meaning of each subgroup. The user equipment randomly selects one preamble from the subgroup corresponding to the size of transmission resource needed for message 3 transmission.

After eNodeB has detected a RACH preamble, it sends 802 a Random Access Response (RAR) message on the PDSCH (Physical Downlink Shared Channel) addressed on the PDCCH with the (Random Access) RA-RNTI identifying the time-frequency slot in which the preamble was detected. If multiple user equipments transmitted the same RACH preamble in the same PRACH resource, which is also referred to as collision, they would receive the same random access response.

The RAR message conveys the detected RACH preamble, a timing alignment command (TA command) for synchronization of subsequent uplink transmissions, an initial uplink resource assignment (grant) for the transmission of the first scheduled transmission (see step 803) and an assignment of a Temporary Cell Radio Network Temporary Identifier (T-CRNTI). This T-CRNTI is used by eNodeB in order to address the mobile(s) whose RACH preamble were detected until RACH procedure is finished, since the "real" identity of the mobile is at this point not yet known by eNodeB.

Furthermore the RAR message can also contain a so-called back-off indicator, which the eNodeB can set to instruct the user equipment to back off for a period of time before retrying a random access attempt. The user equipment monitors the PDCCH for reception of random access response within a given time window, which is configured by the eNodeB. In case user equipment doesn't receive a random access response within the configured time window, it retransmits the preamble at the next PRACH opportunity considering a potentially back off period.

In response to the RAR message received from the eNodeB, the user equipment transmits 803 the first scheduled uplink transmission on the resources assigned by the grant within the random access response. This scheduled uplink transmission conveys the actual random access procedure message like for example RRC connection request, tracking area update or buffer status report. Furthermore it includes either the C-RNTI for user equipments in RRC_CONNECTED mode or the unique 48-bit user equipment identity if the user equipments are in RRC_IDLE mode. In case of a preamble collision having occurred, i.e. multiple user equipments have sent the same preamble on the same PRACH resource, the colliding user equipments will receive the same T-CRNTI within the random access response and will also collide in the same uplink resources when transmitting 803 their scheduled transmission. This may result in interference that no transmission from a colliding user equipment can be decoded at the eNodeB, and the user equipments will restart the random access procedure after having reached maximum number of retransmission for their scheduled transmission. In case the scheduled transmission from one user equipment is successfully decoded by eNodeB, the contention remains unsolved for the other user equipments.

For resolution of this type of contention, the eNode B sends 804 a contention resolution message addressed to the C-RNTI or Temporary C-RNTI, and, in the latter case, echoes the 48-bit user equipment identity contained the scheduled transmission. It supports HARQ. In case of collision followed by a successful decoding of the message sent in step 803, the HARQ feedback (ACK) is only transmitted by the user equipment which detects its own identity, either C-RNTI or unique user equipment ID. Other UEs understand that there was a collision at step 1 and can quickly exit the current RACH procedure and starts another one.

FIG. 9 is illustrating the contention-free random access procedure of 3GPP LTE Rel. 8/9. In comparison to the contention based random access procedure, the contention-free random access procedure is simplified. The eNodeB provides 901 the user equipment with the preamble to use for random access so that there is no risk of collisions, i.e. multiple user equipment transmitting the same preamble. Accordingly, the user equipment is sending 902 the preamble which was signaled by eNodeB in the uplink on a PRACH resource. Since the case that multiple UEs are sending the same preamble is avoided for a contention-free random access, no contention resolution is necessary, which in turn implies that step 804 of the contention based procedure shown in FIG. 8 can be omitted. Essentially a contention-free random access procedure is finished after having successfully received the random access response.

Timing Advance and Component Carrier Aggregation in the Uplink

In currents specifications of the 3GPP standards the user equipment only maintains one timing advance value and applies this to uplink transmissions on all aggregated component carriers. When component carriers are aggregated from different bands, they can experience different interference and coverage characteristics.

Furthermore the deployment of technologies like Frequency Selective Repeaters (FSR) as shown for example in FIG. 11 and Remote Radio Heads (RRH) as shown for example in FIG. 12 will cause different interference and propagation scenarios for the aggregated component carriers. This leads to the need of introducing more than one timing advance within one user equipment.

This leads to the need of introducing more than one timing advance within one UE. There might be a separate timing advance for each aggregated component carrier. Another option is that component carriers that stem from the same location and hence all experience a similar propagation delay are grouped into timing advance groups (TA groups). For each group a separate timing advanced is maintained.

Discussions were already held in 3GPP on this problem but a single timing advance for all aggregated uplink component carriers is regarded as sufficient, since current specifications up to 3GPP LTE-A Rel. 10 support only carrier aggregation of carriers from the same frequency band.

Accordingly, prioritization of different types of uplink transmissions on a plurality of component carriers during a same transmission time interval (TTI) need to be considered. For example when a user equipment (UE) is in power limited state, rules need to determine which uplink transmission should receive the available power.

SUMMARY OF THE INVENTION

One object of the invention is to propose strategies how a mobile terminal utilizes the transmit power available for uplink transmissions of plural transport blocks within a transmission time interval in case a mobile terminal is power limited, i.e. the transmit power that would be required for the transmission of the plural transport blocks within the transmission time interval according to the uplink resources assignments is exceeding the transmit power available for uplink transmissions within a transmission time interval.

Another object of the invention is to propose strategies and methods how a mobile terminal utilizes the transmit power available for uplink transmissions within a transmission time interval in power limited situations, i.e. in situations where the transmit power that would be required for transmitting via the physical random access channel (PRACH) and the physical uplink shared channel (PUSCH)/physical uplink control channel (PUCCH) is exceeding the transmit power available for uplink transmissions within the given transmission time interval.

A further object of the invention is to propose strategies and methods how the delay imposed by the RACH procedures for uplink component carriers to be time aligned can be reduced in systems using carrier aggregation in the uplink.

At least one of these objects is solved by the subject matter of the independent claims. Advantageous embodiments are subject to the dependent claims.

A first aspect of the invention is the prioritization of the power allocation for individual transport blocks corresponding to plural uplink resource assignments within power control. This aspect is particularly applicable to situations where the mobile terminal is power limited. According to this aspect of the invention, the order of processing the uplink resource assignments (priority order) on the uplink component carriers is used to determine power scaling for the power allocation of the individual transport blocks to be transmitted on the respective component carriers in the uplink. In power limited situations, the mobile terminal reduces the transmit power for the transmission of each of the transport blocks according to the priority of the respective transport block given by the priority order, such that the total transmit power spent for the transmissions of the transport blocks becomes smaller or equal to a maximum transmit power available to the mobile terminal for transmitting the transport blocks.

According to one exemplary implementation the transmit power scaling is reducing the transmit power is taking into account the priority of the resource assignment of a respective transport block /component carrier on which the respective transport block is to be transmitted, as given by the priority/processing order in that transmission of transport blocks having high priority should be least effected by the transmit power reduction. Advantageously, the lower (higher) the priority of the resource assignment/component carrier according to the priority order, the larger (smaller) the power reduction applied to the transmit power for the transport block required by its corresponding uplink resource assignment. Ideally, the transmission power of high priority transport blocks should not be reduced, if possible, but rather the transmit power reduction to meet a maximum transmit power available to the mobile terminal for transmitting the transport blocks should be first tried to be obtained by limiting the transmit power for transmissions of low priority transport blocks.

A second aspect of the invention is the prioritization of the power allocation for simultaneous uplink transmissions via different physical channels (i.e. there are multiple uplink transmissions within the same transmission time interval). Examples for physical channels allowing uplink transmissions are physical uplink shared channel (PUSCH), the physical uplink control channel (PUCCH) and the physical random access channel (PRACH). Prioritizing the power allocation for uplink transmission via different physical channels allows assigning individual transmit powers. This power allocation may be independent from the component carrier on which a respective uplink transmission is sent.

According to this second aspect different transmit power levels may be used for simultaneous uplink transmissions via a physical random access channel (PRACH) and via a physical uplink shared channel (PUSCH). Alternatively, the second aspect of the invention can also be used to individually scale the transmit power for simultaneous uplink transmissions via a physical random access channel (PRACH) and via a physical uplink control channel (PUCCH). Scaling transmit power for uplink transmissions based on a prioritization of the physical channels may be for example used to improve the SINR of the respective uplink transmission via the prioritized physical channel. For instance, a reduction of the transmit power for uplink transmissions based on the prioritization of the physical channels may allow the mobile terminal to meet a given power constraint, if the mobile terminal in a power limited situation.

In an exemplary embodiment of the invention that is in line with the second aspect of the invention, the transmit power for physical uplink shared channel (PUSCH) transmissions and/or physical random access channel (PRACH) transmissions is reduced according to a respective prioritization of the corresponding the channels. In this context, either the transmit power for physical uplink shared channel (PUSCH) transmissions is prioritized over the transmit power for physical random access channel (PRACH) transmissions or vice versa. Advantageously, the lower (higher) the priority of the physical channel transmission, the larger (smaller) the power reduction applied to the transmit power for transmitting via the physical channel. Ideally, in order to meet a transmit power constraint in a power limited situation, it may be tried to first limit the transmit power for low priority physical channel transmissions, and then—if the transmit power constraint is still not met—also the transmit power for physical channel transmissions of higher priority may be limited.

A third aspect of the invention is to adjust the transmit power used for performing random access (RACH) procedures based on the number of RACH procedures required for time aligning plural uplink component carriers. Depending on the number of uplink component carriers that are to be time aligned, a mobile terminal performs one or more RACH procedures for time aligning the uplink component carriers. A RACH procedure requires processing resources and introduces restrictions on uplink transmissions that can be performed in parallel by a mobile terminal. It may be thus desirable to perform as few RACH procedures as possible. Adjusting the transmit power based on the number of required RACH procedures can improve the success probability of each of the required RACH procedures. Due to a higher success probability of the RACH procedures, the delay introduced by the RACH procedures for uplink component carriers to be time aligned is reduced.

According to one exemplary embodiment, a user equipment could utilize the transmit power of one or more RACH procedures that are not required (i.e. that are superfluous and thus not performed) for adjusting the transmit power to perform only the required RACH procedures for time aligning the plural uplink component carriers improves the success probability of each of the required RACH procedures.

The first, second and third aspect of this invention can be readily combined with each other and may use the same priority/processing order of the resource assignments in transport block generation (logical channel prioritization) and of uplink transmission on a physical random access channel (PRACH) and power scaling of the transmissions of the generated transport blocks and of transmission on a physical random access channel (PRACH) in the uplink.

According to one exemplary implementation of the invention in line with the first and second aspect of the invention, a method for adjusting the transmit power utilized by a mobile terminal for uplink transmissions is provided, wherein the mobile terminal is configured with at least a first and a second uplink component carrier. The mobile terminal determines a transmit power required for transmitting a transport block $P_{PUSCH}(i)$ via a physical uplink shared channel on the first uplink component carrier. Further, the mobile terminal determines a transmit power required for transmitting a random access preamble $P_{PRACH}(i)$ via a physical random access channel on the second uplink component carrier. Furthermore, the mobile terminal reduces the determined transmit power for the physical uplink shared channel transmission and/or the physical random access channel transmission according to a prioritization between the transmit power for the physical uplink shared channel transmission and the transmit power for the physical random access channel transmission and transmits the transport block on the first uplink component carrier and the random access preamble on the second uplink component carrier within a transmission time interval i, using the respective transmit powers.

In one exemplary implementation, the mobile terminal may further determine a transmit power required for transmitting another transport block via an assigned physical uplink shared channel on a third component carrier. The transmit powers for transmitting each transport block $P_{PUSCHc}(i)$ are determined according to the corresponding uplink component carrier c where the uplink component carriers have a priority order. Further, the mobile terminal reduces the determined transmit power for transmitting each transport block $w^c \cdot P_{PUSCHc}(i)$ according to the priority order, where $w_c \in [0, \ldots, 1]$; and transmits each transport block using the respective reduced transmit power.

In a more detailed implementation, the transmit power for transmitting via a physical uplink shared channel is prioritized over the transmit power for transmitting via a physical random access channel. In this case, the mobile terminal first reduces the determined transmit power $P_{PRACH}(i)$ for transmitting the random access preamble via the physical random access channel and then reduces the transmit power $$\sum_c P_{PUSCH_c}(i)$$

for transmitting each transport block via the physical uplink shared channels on the uplink component carriers within the transmission time interval i.

Furthermore, in another exemplary embodiment of the invention, the transmit power of physical random access channel transmissions is prioritized over the transmit power of physical uplink shared channel transmissions. In this case, the mobile terminal reduces the transmit power $$\sum_c P_{PUSCH_c}(i)$$

for transmission via the physical uplink shared channels on the uplink component carriers, uses the determined transmit power $P_{PRACH}(i)$ for transmission via the physical random access channel and uses a non-reduced transmit power $P_{PUCCH}(i)$ for transmitting on a physical uplink control channel within the transmission time interval i.

In another exemplary embodiment of the invention, the mobile terminal reduces the determined transmit powers such that the sum of the determined transmit powers is smaller or equal to a maximum transmit power available $P_{MAX}$ to the mobile terminal for transmitting on the uplink component carriers within the transmission time interval i.

In a further exemplary embodiment of the invention, the mobile terminal further determines a transmit power required for transmitting another random access preamble via a physical random access channel on a fourth uplink component carrier within the transmission time interval i. The transmit powers for transmitting each random access preamble $P_{PRACHc}(i)$ are determined according to the corresponding uplink component carrier c, where the uplink component carriers having a priority order. Further, the mobile terminal reduces the determined transmit powers for transmitting each random access preamble $w_c \cdot P_{PRACHc}(i)$ according to the priority order, where $w_c \in [0, \ldots, 1]$; and transmits each random access preamble using the respective reduced transmit power.

In another more detailed implementation, each uplink component carrier is assigned a cell index and the mobile terminal reduces the determined transmit power for transmitting each random access preamble $w_c \cdot P_{PRACHc}(i)$ based on the priority order given by the cell indexes of the uplink component carriers.

Furthermore, in another exemplary implementation of the invention, the mobile terminal is configured with one uplink component carrier as the primary component carrier and with any other uplink component carrier as a secondary component carrier. In this case, the mobile terminal reduces the determined transmit power for transmitting each random access preamble $w_c \cdot P_{PRACHc}(i)$, where the primary component carrier is prioritized over any other secondary component carrier.

According to another implementation of the invention, the mobile terminal reduces the transmit power for transmitting each random access preamble $w_c \cdot P_{PRACHc}(i)$ is based on a flag for each random access preamble. The flag indicates for each random access preamble to be transmitted whether or not a request for transmitting the respective random access preamble was previously received for the corresponding uplink component carrier by the terminal.

In another embodiment of the invention, the mobile terminal determines the transmit power for transmitting a random access preamble via a random access channel on each of the second and the fourth component carrier by utilizing a first offset $P_{0\_PRACH}$, in case the uplink component carrier to be time aligned and uplink component carriers already time aligned belong to a same timing advance group; and a second, different offset $$P_{0\_PRACH_{multiple}},$$

in case the unlink component carrier to be time aligned and uplink component carriers already time aligned belong to more than one timing advance groups.

In a more detailed implementation of the invention, the first offset $P_{0\_PRACH}$ and the second offset $$P_{0\_PRACH_{multiple}}$$

are signaled to the mobile terminal by a base station.

In a further exemplary embodiment, the mobile terminal determines the transmit power for transmitting a random access preamble via a physical random access channel on an uplink component carrier to be time aligned includes re-utilizing a previously determined power ramping step $N_c$ for the corresponding uplink component carrier or re-utilizing a different, previously determined power ramping step $N_{-c}$ for a different uplink component carrier The mobile terminal uses the power ramping step $N_c$ and/or $N_{-c}$ for ramping the transmit power of consecutive transmissions of the random access preamble.

Furthermore, in a detailed implementation, the mobile terminal determines the transmit power for transmitting a random access preamble via a physical random access channel on an uplink component carrier by: $P_{PRACHc}(i) = \min\{P_{0\_PRACH} - PL(i) + (N-1)\Delta_{RACH} + \Delta_{Preamble}, P_{MAX}\}$ where $N \in \{N_c, N_{-c}\}$, in case the uplink component carrier to be time aligned and uplink component carriers already time aligned belong to a same timing advance group; and $$P_{PRACH_c}(i) = \min\{P_{0\_PRACH_{multiple}} - PL(i) + (N-1)\Delta_{RACH} + \Delta_{Preamble}, P_{MAX}\}$$

where N ∈ {$N_c, N_{\neg c}$}, in case the uplink component carrier to be time aligned and uplink component carriers already time aligned belong to more than one timing advance groups.

In another embodiment of the invention, the mobile terminal adds a base station dependent pre-scaling offset $\Delta \text{offset}_c$ that has been received by the mobile terminal form a base station for an uplink component carrier c to adjust the transmit power for transmitting random access preambles on the respective uplink component carrier.

Furthermore, in a detailed implementation of the invention, the mobile terminal determines transmit power for transmitting a random access preamble via a physical random access channel on an uplink component carrier by:

$$P_{PRACHc}(i) = \min\{P_{0\_PRACH} - PL(i) + (N-1)\Delta_{RACH} + \Delta_{Preamble} + \Delta \text{offset}_c, P_{MAX}\}$$

where N ∈ {$N_c, N_{\neg c}$}, in case the uplink component carrier to be time aligned and uplink component carriers already time aligned belong to a same timing advance group, and $$P_{PRACH_c}(i) = \min\{P_{0\_PRACH_{multiple}} - PL(i) + (N-1)\Delta_{RACH} + \Delta_{Preamble} + \Delta \text{offset}_c, P_{MAX}\}$$

where N ∈ {$N_c, N_{\neg c}$}, in case the uplink component carrier to be time aligned and uplink component carriers already time aligned belong to more than one timing advance groups.

According to another exemplary implementation of the invention in line with the second and third aspect of the invention, a method for adjusting the transmit power used by a mobile terminal for one or more RACH procedures is provided, where the mobile terminal is allowed RACH access on plural uplink component carriers. The mobile terminal determines, for uplink component carriers to be time aligned, the number of RACH procedures required for time aligning the uplink component carriers. Further, the mobile terminal performs the determined number of RACH procedures required for time aligning the uplink component carriers, wherein a transmit power for all of the one or more RACH procedures is determined according to the determined number of required RACH procedures.

In a more advanced implementation, the mobile terminal determines the transmit power for all of the one or more RACH procedures utilizing a first offset $P_{0\_PRACH}$, in case of determining one required RACH procedure, and utilizing a second, different offset $$P_{0\_PRACH_{multiple}},$$

in case of determining more than one required RACH procedure, the second offset $$P_{0\_PRACH_{multiple}}$$

having a higher value than the first offset $P_{0\_PRACH}$.

According to another alternative embodiment, the mobile terminal is configured with one uplink component carrier as the primary component carrier and with any other uplink component carrier as a secondary component carrier. The mobile terminal determines the transmit power for RACH procedures utilizing a first offset $P_{0\_PRACH}$, in case a RACH procedure is to be performed on the primary component carrier, and utilizing a second, different offset $$P_{0\_PRACH_{multiple}},$$

in case or more RACH procedures are to be performed on the secondary component carrier, the second offset $$P_{0\_PRACH_{multiple}}$$

having a higher value than the first offset $P_{0\_PRACH}$.

In a further implementation, the mobile terminal determines the number of required RACH procedures based on a number of different timing advance groups to which said uplink component carriers to be time aligned belong.

According to another implementation of the invention, each of the required one or more RACH procedures is performed on uplink component carriers belonging to different timing advance groups among the uplink component carriers to be time aligned.

In a further embodiment, the identified number of required RACH procedures is equal to the number of different timing advance groups of the plurality of uplink component carriers to be time aligned.

Furthermore, in another implementation, the uplink component carriers to be time aligned are uplink component carriers activated at the mobile terminal.

In a more detailed implementation, the time alignment of the uplink component carriers comprises configuring a timing advance value per timing advance group.

According to another exemplary embodiment of the invention, the number of required RACH procedures corresponds to the number of timing advance groups to which the uplink component carriers to be time aligned belong, excluding those timing advance groups for which the mobile terminal is already time-aligned.

Furthermore, it should also be noted that of course the different criteria and rules outlined above could be combined arbitrarily with each other to adjust the transmit power to be used by the mobile terminal for uplink transmissions.

According to another exemplary implementation of the invention in line with the first and second aspect of the invention, a mobile terminal for controlling the transmit power for uplink transmissions is provided, wherein the mobile terminal is configured with at least a first and a second uplink component carrier.

The mobile terminal comprises a processing unit for determining a transmit power required for transmitting a transport block $P_{PUSCH}(i)$ via a physical uplink shared channel on the first uplink component carrier, and for determining a transmit power required for transmitting a random access preamble $P_{PRACH}(i)$ via a physical random access channel on the second uplink component carrier. Further, the mobile terminal includes a power control unit for reducing the determined transmit power for the physical uplink shared channel transmission and/or the physical random access channel transmission according to a prioritization between the transmit power for the physical uplink shared channel transmission and the transmit power for the physical random access channel transmission. The mobile terminal has also a transmitter for transmitting the transport block on the first uplink component carrier and the random access preamble on the second uplink component carrier within a transmission time interval i, using the respective transmit power.

According to a more detailed implementation of the invention, the mobile terminal further comprises a processing unit adapted to determine a transmit power required for transmitting another random access preamble via a physical random access channel on a fourth uplink component carrier within the transmission time interval i, and the transmit powers for transmitting each random access preamble $P_{PRACH_c}(i)$ are determined according to the corresponding uplink component carrier c, the uplink component carriers having a priority order. The mobile terminal also has a power control unit adapted to reduce the determined transmit powers further includes reducing the determined transmit powers for transmitting each random access preamble $w_c \cdot P_{PRACH_c}(i)$ according to the priority order, where $w_c \in [0, \ldots, 1]$; and wherein the transmitter is adapted to transmit each random access preamble using the respective reduced transmit power.

Another embodiment of the invention, in line with the second and third aspect of the invention, is providing a mobile terminal for adjusting the transmit power used by a mobile terminal for one or more RACH procedures, the mobile terminal being allowed access on plural uplink component carriers. The mobile terminal includes means for determining, for uplink component carriers to be time aligned, the number of RACH procedures required for time aligning the uplink component carriers. The mobile terminal further comprises means for performing the determined number of RACH procedures required for time aligning the uplink component carriers, wherein a transmit power for all of the one or more RACH procedures is determined according to the determined number of required RACH procedures.

According to another embodiment of the invention, a base station for use with the mobile terminal performing a method for adjusting the transmit power for transmitting random access preambles via physical random access channels on uplink component carriers is provided. The base station includes a power control unit configured to signal an offset $$P_{0\_PRACH_{multiple}}$$

to the mobile terminal, where in the offset $$P_{0\_PRACH_{multiple}}$$

is utilized by the mobile terminal for determining a transmit power for transmitting a random access preamble in case the uplink component carrier to be time aligned and uplink component carriers already time aligned belong to more than one timing advance groups. The bases station also has a receiving unit for receiving random access preambles on the uplink component carriers with a transmit power that has been determined by the mobile terminal utilizing the offset $$P_{0\_PRACH_{multiple}}.$$

In a exemplary detailed implementation, the base station further comprises a power control unit is further configured to signal another offset $P_{0\_PRACH}$ to the mobile terminal, wherein the other offset $P_{0\_PRACH}$ is utilized by the mobile terminal for determining a transmit power for a random access preamble in case the uplink component carrier to be time aligned and uplink component carriers already time aligned belong to a same timing advance group. The base station also has a receiving unit is configured to receive random access preambles on the uplink component carriers with a transmit power that has been determined by the mobile terminal utilizing the other offset $P_{0\_PRACH}$.

In a further exemplary embodiment of the invention, a base station for use with the mobile terminal performing a method for adjusting the transmit power for transmitting random access preambles via physical random access channels on uplink component carriers is provided. The base station includes a power control unit for signaling a base station dependent pre-scaling offset $\Delta \text{offset}_c$ for an uplink component carrier c to a mobile terminal to be added by the mobile terminal for determining a transmit power for transmissions of random access preambles on the uplink component carrier. Further, the base station comprises a receiving unit for receiving random access preambles on the uplink component carrier with a transmit power that has been determined by the mobile terminal adding the base station dependent pre-scaling offset $\Delta \text{offset}_c$ for the uplink component carrier c.

Another exemplary embodiment of the invention in line with the first and second aspect of this invention is related to a computer readable medium storing instructions that, when executed by a processor of a mobile terminal, cause the mobile terminal to adjust the transmit power utilized by the mobile terminal for uplink transmissions, wherein the mobile terminal is configured with at least a first and a second uplink component carrier, by determining a transmit power required for transmitting a transport block $P_{PUSCH}(i)$ via a physical uplink shared channel on the first uplink component carrier, and determining a transmit power required for transmitting a random access preamble $P_{PRACH}(i)$ via a physical random access channel on the second uplink component carrier. Furthermore, the mobile terminal is caused to reduce the determined transmit power for the physical uplink shared channel transmission and/or the physical random access channel transmission according to a prioritization between the transmit power for the physical uplink shared channel transmission and the transmit power for the physical random access channel transmission, and to transmit the transport block on the first uplink component carrier and the random access preamble on the second uplink component carrier within a transmission time interval i, using the respective transmit power.

In another embodiment of the invention, which is in line with the second and third aspect of the invention, the execution of the instructions on the computer-readable medium by the processor cause the mobile terminal to adjust the transmit power used for one or more RACH procedures, the mobile terminal being allowed access on plural uplink component carriers, by determining, for uplink component carriers to be time aligned, the number of RACH procedures required for time aligning the uplink component carriers. The execution of the instructions further cause the mobile terminal to perform the determined number of RACH procedures required for time aligning the uplink component carriers, wherein a transmit power for all of the one or more RACH procedures is determined according to the determined number of required RACH procedures.

Another computer-readable medium according to a further embodiment of the invention stores instructions that, when executed by a processor of a base station for use with the mobile terminal performing a method for adjusting the transmit power for transmitting random access preambles via physical random access channels on uplink component carriers, cause the base station to signal an offset $$P_{0\_PRACH_{multiple}}$$

to the mobile terminal, wherein the offset $$P_{0\_PRACH_{multiple}}$$

is utilized by the mobile terminal for determining a transmit power for a random access preamble in case the uplink component carrier to be time aligned and uplink component carriers already time aligned belong to a same timing advance group. Further, the base station is caused to receive random access preambles on the uplink component carriers with a transmit power that has been determined by the mobile terminal utilizing the offset $$P_{0\_PRACH_{multiple}}.$$

A further computer-readable medium according to another embodiment of the invention stores instructions that, when executed by a processor of a base station for use with the mobile terminal performing a method for adjusting the transmit power for transmitting random access preambles via physical random access channels on uplink component carriers, cause the base station to signal a base station dependent pre-scaling offset $\Delta\text{offset}_c$ for an uplink component carrier c to a mobile terminal to be added by the mobile terminal for determining a transmit power for transmissions of random access preambles on the uplink component carrier.

The execution of the instructions further cause the base station to receive random access preambles on the uplink component carrier with a transmit power that has been determined by the mobile terminal adding the base station dependent pre-scaling offset $\Delta\text{offset}_c$ for the uplink component carrier c.

BRIEF DESCRIPTION OF THE FIGURES

In the following the invention is described in more detail in reference to the attached figures and drawings. Similar or corresponding details in the figures are marked with the same reference numerals.

FIGS. 3 & 4 show an exemplary localized allocation and distributed allocation of the uplink bandwidth in a single carrier FDMA scheme.

DETAILED DESCRIPTION OF THE INVENTION

Figure 1:
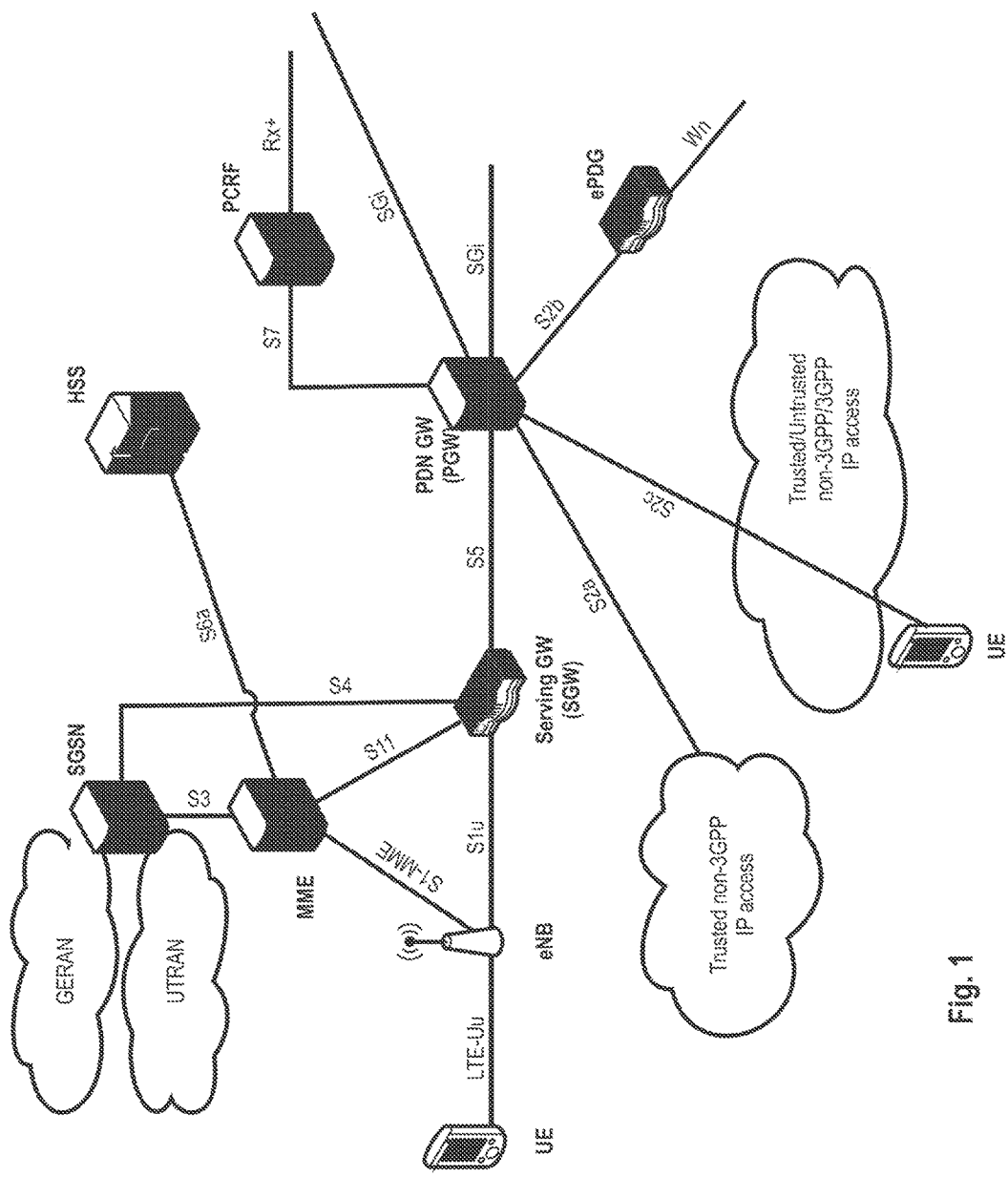
FIG. 1 shows an exemplary architecture of a 3GPP LTE system.
Figure 2:
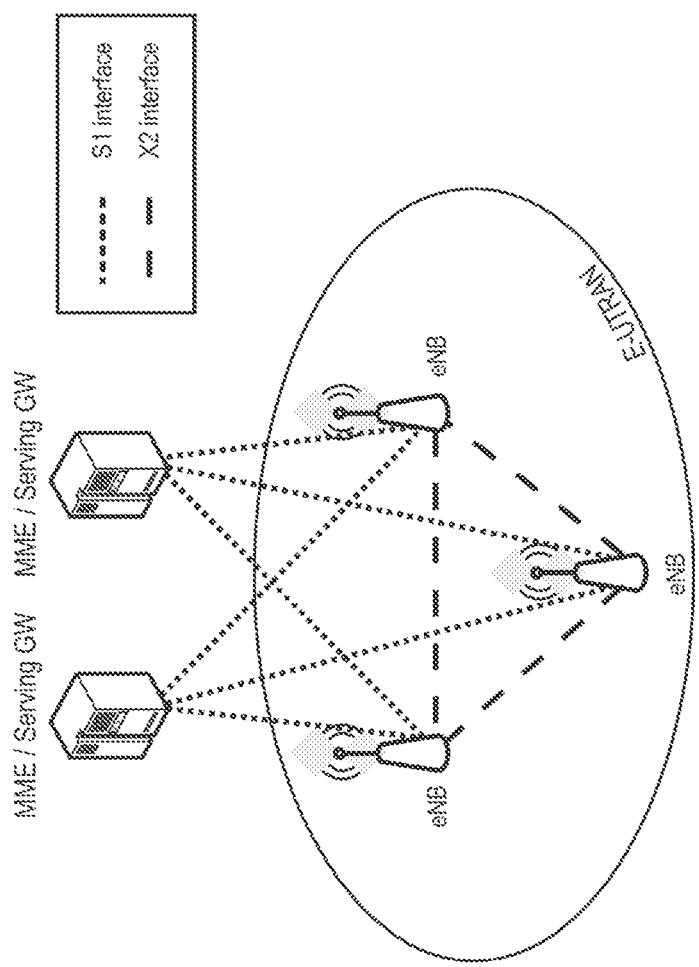
FIG. 2 shows an exemplary overview of the overall E-UTRAN architecture of LTE.
Figure 5:
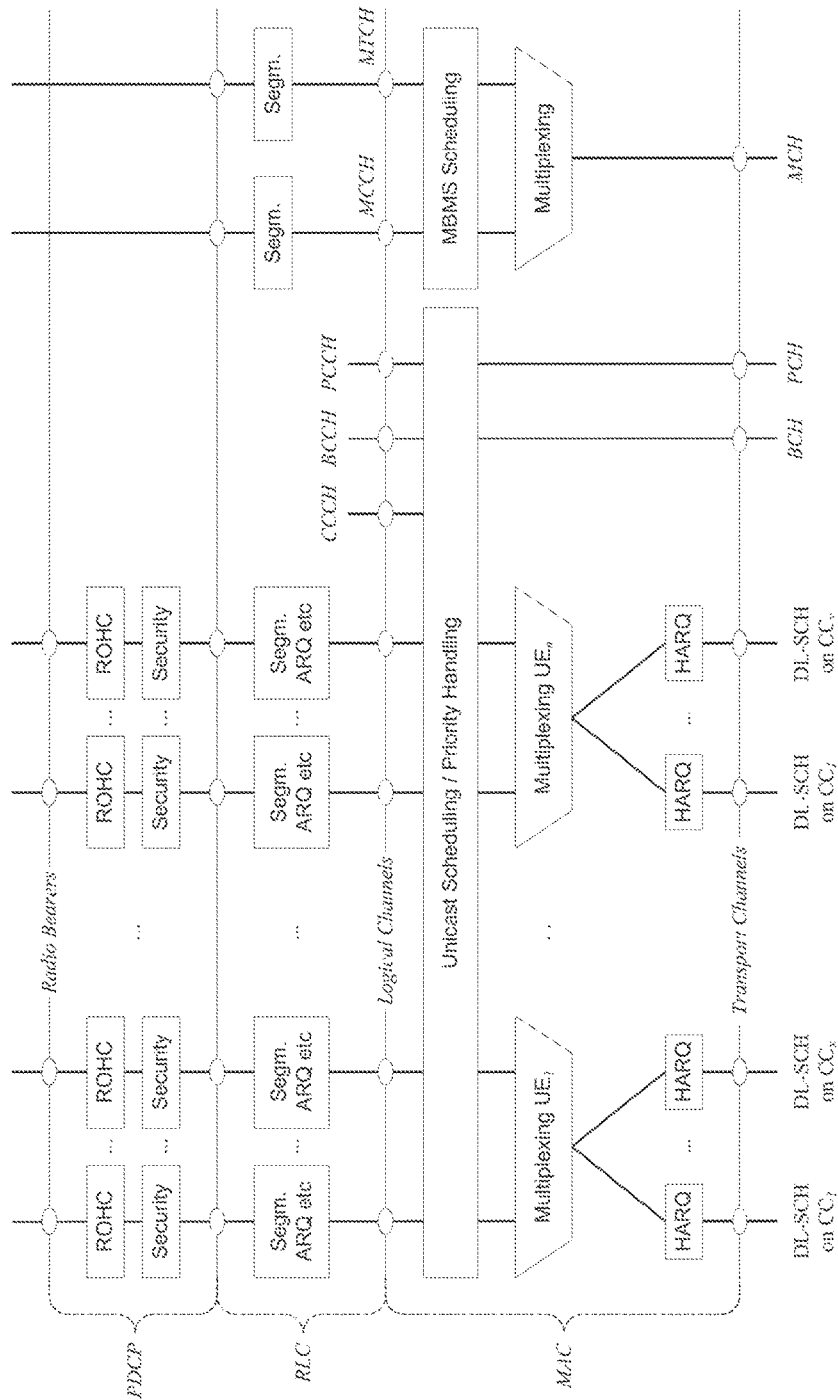
FIGS. 5 & 6 show the 3GPP LTE-A (Release 10) Layer 2 structure with activated carrier aggregation for the downlink and uplink, respectively, FIG. 7 exemplifies the time alignment of an uplink component carrier relative to a downlink component carrier by means of a timing advance as defined for 3GPP LTE (Release 8/9)
Figure 6:
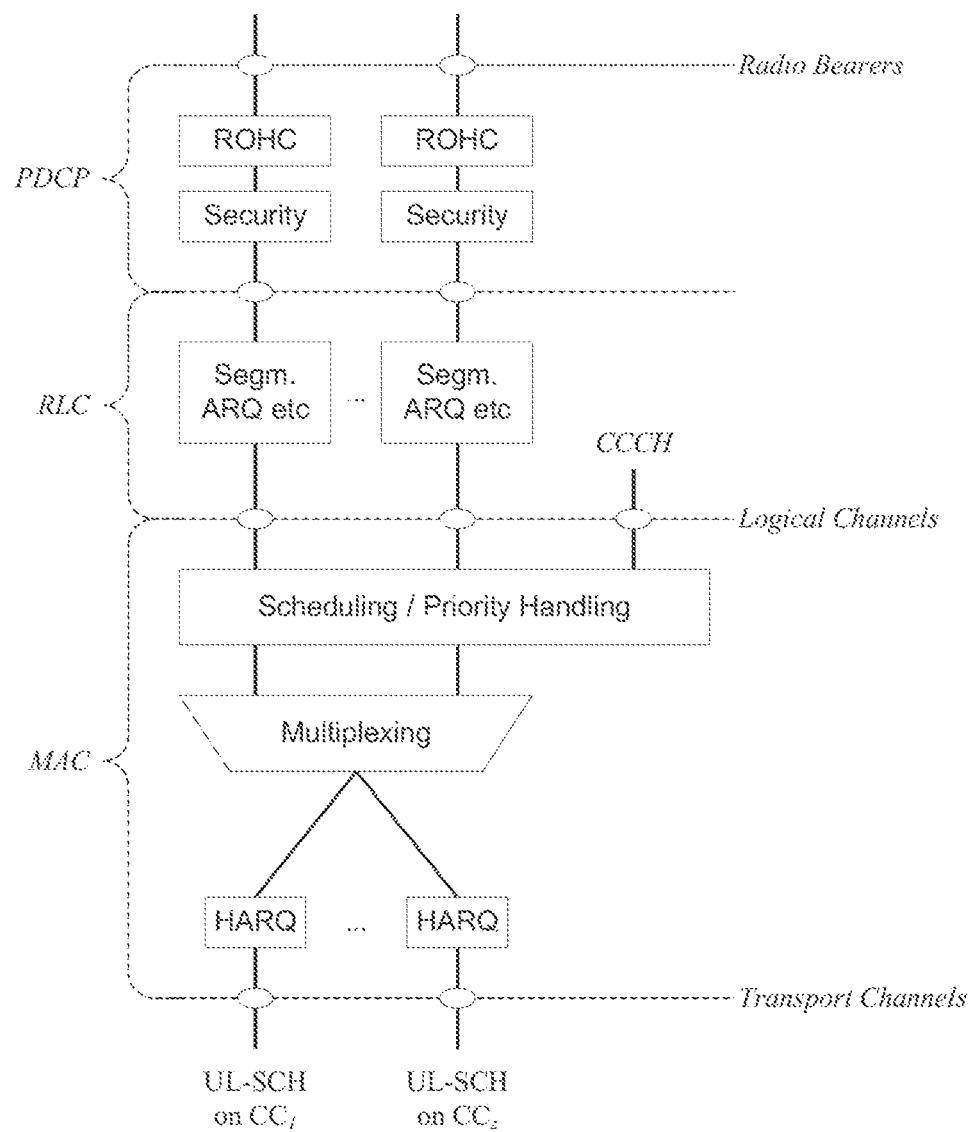
Figure 7:
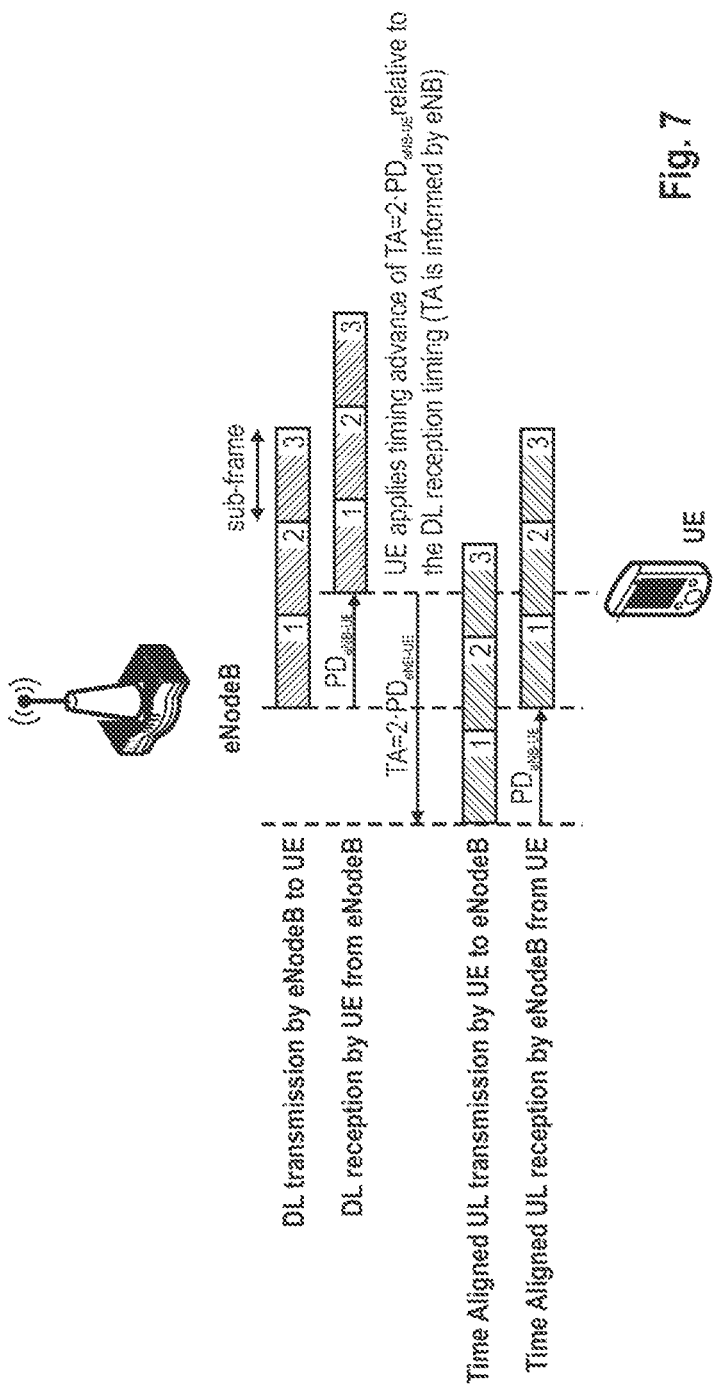

The following paragraphs will describe various embodiments of the invention. For exemplary purposes only, most of the embodiments are outlined in relation to an orthogonal single-carrier uplink radio access scheme according to the LTE-A mobile communication system discussed in the Technical Background section above. It should be noted that the invention may be advantageously used for example in connection with a mobile communication system such as the LTE-A communication system previously described, but the invention is not limited to its use in this particular exemplary communication network.

The explanations given in the Technical Background section above are intended to better understand the mostly LTE-A specific exemplary embodiments described herein and should not be understood as limiting the invention to the described specific implementations of processes and functions in the mobile communication network. Nevertheless, the improvements proposed herein may be readily applied in the architectures/systems described in the Technical Background section and may in some embodiments of the invention also make use of standard and improved procedures of theses architectures/systems.

The invention aims to provide an efficient and tight QoS control for uplink transmissions by a base station (eNodeB or Node B in the 3GPP context) in a scenario where a mobile terminal (user equipment in the 3GPP context) is assigned multiple uplink resources in one transmission time interval (e.g. one or more sub-frames). The invention also provides an efficient utilization of the transmit power available to the mobile terminal for uplink transmissions in a TTI, even in cases where the mobile terminal is power limited.

A consideration underlying this invention is to introduce a priority order for the uplink resource assignments (respectively for the transport blocks corresponding thereto). This priority order is considered by the mobile terminal when generating the transport blocks for uplink transmission and/or in the distribution of the transmit power available to the mobile terminal for uplink transmissions in a TTI to the respective transport blocks to be transmitted within the TTI. The priority order is sometimes also referred to as the processing order. This is—as will become more apparent from the following—because the priority order defined for the uplink resource assignments (respectively for the transport blocks corresponding thereto) is implying the order in which the uplink resource assignments (respectively for the transport blocks corresponding thereto) are processed.

One aspect of the invention is the prioritization of the power allocation for individual transport blocks corresponding to plural uplink resource assignments within power control. This aspect is particularly applicable to situations where the mobile terminal is power limited and ensures an efficient distribution of the available transmit power to the different transport blocks. According to this aspect of the invention, the order of processing the uplink resource assignments (priority order) on the uplink component carriers is used to determine power scaling for the power allocation of the individual transport blocks to be transmitted on the respective component carriers in the uplink. According to this aspect of the invention, a per-component carrier, respectively per-transport block or per-resource assignment, power scaling is applied.

In power limited situations, the mobile terminal reduces the transmit power for the transmission of each of the transport blocks according to the priority of the respective transport block given by the priority order, such that the total transmit power spent for the transmissions of the transport blocks becomes smaller or equal to a maximum transmit power available to the mobile terminal for transmitting the transport blocks in the uplink within a given TTI.

According to one exemplary implementation the transmit power scaling is reducing the transmit power and is taking into account the priority of the resource assignment of a respective transport block (or component carrier on which the respective transport block is to be transmitted), as given by the priority order in that transmission of transport blocks having high priority should be least effected by the transmit power reduction. Advantageously, the lower (higher) the priority of the resource assignment/component carrier according to the priority order, the larger (smaller) the power reduction applied to the transmit power for the transport block required by its corresponding uplink resource assignment.

As mentioned before, the power scaling may be ideally configured such that the transmission of high priority transport blocks should be not reduced where possible. Instead the transmit power reduction to meet the a maximum transmit power available to the mobile terminal for transmitting the transport blocks in the uplink within a given TTI should be first tried to be obtained by limiting the transmit power of transmissions of low priority transport blocks.

Moreover, in a more advanced implementation, the power control mechanism in the mobile terminal ensures that the control information to be signaled on a physical uplink control channel, such as the PUCCH in LTE-A, do not undergo power scaling, but only transmissions on the physical uplink shared channel, i.e. transport blocks, transmitted concurrently to the control information, such as the PUCCH in LTE-A, within the same TTI is subject to power scaling. In other words, the power control mechanism is designed to assign the remainder of the difference between the transmit power available to the mobile terminal for uplink transmissions within a TTI and the transmit power required for the signaling of control information on the physical uplink control channel is distributed on a per-transport block basis to the transport blocks on the physical uplink shared channel taking into account the priority order of the transport blocks.

A second aspect of the invention is the prioritization of the power allocation for simultaneous uplink transmissions via different physical channels (i.e. there are multiple uplink transmissions within the same transmission time interval). Examples for physical channels allowing uplink transmissions are physical uplink shared channel (PUSCH), the physical uplink control channel (PUCCH) and the physical random access channel (PRACH). Prioritizing the power allocation for uplink transmission via different physical channels allows assigning individual transmit powers. This power allocation may be independent from the component carrier on which a respective uplink transmission is sent.

According to this second aspect different transmit power levels may be used for simultaneous uplink transmissions via a physical random access channel (PRACH) and via a physical uplink shared channel (PUSCH). Alternatively, the second aspect of the invention allows to to individually scale the transmit power of simultaneous uplink transmissions via a physical random access channel (PRACH) and via a physical uplink control channel (PUCCH). Scaling transmit power for uplink transmissions based on a prioritization of the physical channels may be for example used to improve the SINR of the respective uplink transmission via the prioritized physical channel. For instance, a reduction of the transmit power for uplink transmissions based on the prioritization of the physical channels may allow the mobile terminal to meet a given power constraint, if the mobile terminal in a power limited situation.

In an exemplary embodiment of the invention that is in line with the second aspect of the invention, the transmit power for physical uplink shared channel (PUSCH) transmissions and/or physical random access channel (PRACH) transmissions is reduced according to a respective prioritization of the corresponding the channels. In this context, either the transmit power for physical uplink shared channel (PUSCH) transmissions is prioritized over the transmit power for physical random access channel (PRACH) transmissions or vice versa.

Advantageously, the lower (higher) the priority of the physical channel transmission, the larger (smaller) the power reduction applied to the transmit power for transmitting via the physical channel.

Ideally, in order to meet a transmit power constraint in a power limited situation, it may be tried to first limit the transmit power for low priority physical channel transmissions, and then—if the transmit power constraint is still not met—also the transmit power for physical channel transmissions of higher priority may be limited.

In an alternative embodiment of the invention, the prioritization of the power allocation for simultaneous uplink transmissions via different physical channels can be advantageously combined with the first aspect of the invention of prioritizing the power allocation for individual transport blocks corresponding to plural uplink resource assignments within power control.

When the user equipment is configured with multiple uplink component carriers belonging to more than one timing advance group, the user equipment may be required to perform more than one RACH procedure for time aligning the respective uplink component carriers within the same transmission time interval. In other words, the user equipment may be required to transmit more than one random access preamble via the PRACH channel within the same TTI. Accordingly, in a further more advanced embodiment of the invention, a prioritization of the power allocation for the transmission of RACH preamble of individual RACH procedures is performed, in case multiple PRACH procedures are to be performed simultaneously.

In a further alternative embodiment of the invention, the priority order according to which the user equipment is determining the transmit power of the RACH preambles for multiple RACH procedures is linked to the indices assigned to the configured uplink component carriers. Each component carrier may be assigned an individual cell index or carrier index (CI), and the priority order may be defined according to the cell indices or carrier indices of the component carriers on which the uplink resources are assigned.

In an exemplary and more advanced implementation, the eNodeB may assign the cell indices or carrier indices, respectively, such that the higher/lower the priority of the component carrier the higher/lower the cell index or component carrier index of the component carrier. In this case, the user equipment should determine the transmit power for transmissions of the RACH preambles for multiple RACH procedures in decreasing carrier indicator order.

In a further alternative embodiment of the invention, the priority order for determining the transmit power for RACH preamboles of multiple RACH procedures depends on the type of component carrier. As described above there is one primary uplink component carrier (PCC) configured per-user equipment and potentially multiple secondary uplink component carriers (SCC). According to this embodiment a user equipment always assigns the transmit power for transmitting the RACH preamble that is part of a RACH procedure for the PCC, before assigning a transmit power of the RACH preamble of a RACH procedure to be performed on any other uplink resource assignments within a TTI. Regarding the transmit power assignments for the RACH preambles of the RACH procedures to be performed on SCC(s), there are several options. For example, the assignment of transmit power for performing RACH procedures on the SCC(s) could be left to user equipment implementation. Alternatively the transmit power assignment for performing RACH procedures on the SCC(s) could be treated in the order of the assigned cell indices or carrier indices.

A third aspect of the invention is to adjust the transmit power used for in random access (RACH) procedures based on the number of RACH procedures required for time aligning plural uplink component carriers. Depending on the number of uplink component carriers that are to be time aligned, a mobile terminal performs one or more RACH procedures for time aligning the uplink component carriers. A RACH procedure requires processing resources and introduces restrictions on uplink transmissions that can be performed in parallel by a mobile terminal. It may be thus desirable to perform as few RACH procedures as possible. Adjusting the transmit power for the RACH preamble(s) based on the number of required RACH procedures can improve the success probability of each of the required RACH procedures. Due to a higher success probability of the RACH procedures, the delay introduced by the RACH procedures for uplink component carriers to be time aligned is reduced.

According to one exemplary embodiment of the invention, a user equipment could "reutilize" the transmit power of one or more RACH procedures that are not required (i.e. that are superfluous and thus not performed) for adjusting the transmit power to perform only the required RACH procedures for time aligning the plural uplink component carriers improves the success probability of each of the required RACH procedures.

In an alternative embodiment of the invention, the user equipment increases the transmit power used for transmitting the RACH preambles, when plural RACH procedures are required for time aligning the plural uplink component carriers. For example, the user equipment uses a first offset $P_{0\_PRACH}$, in case there is only one RACH procedure to be preformed, and utilizing a second, different offset $$P_{0\_PRACH_{multiple}},$$

in case there is more than one RACH procedure to be performed. Advantageously, the second offset $$P_{0\_PRACH_{multiple}}$$

has a higher value than the first offset $P_{0\_PRACH}$, which may improve the success probability when performing plural RACH procedures.

In a further, alternative embodiment of the invention, the user equipment may individually increase the transmit power used for the RACH preambles in the RACH procedures depending on the type of component carrier on which a respective one of the RACH procedures is performed. It may be assumed for exemplary purposes that there is one primary component carrier (PCC) configured per user equipment and optionally one or more secondary component carriers (SCC). Accordingly, a user equipment would determine a transmit power for the preamble of a RACH procedure utilizing a first offset $P_{0\_PRACH}$, in case the RACH procedure is to be performed on the PCC. The user equipment would utilize a second, different offset $$P_{0\_PRACH_{multiple}},$$

in case the RACH procedure is to be performed on a secondary component carrier. As noted previously, the second offset $$P_{0\_PRACH_{multiple}}$$

may heave a higher value than the first offset $P_{0\_PRACH}$.

In an exemplary implementation of the third aspect of the invention, there are several options for determining (or limiting) the number of required RACH procedures for plural uplink component carriers to be time aligned. For example, the determination of the number of required RACH procedures could be left to user equipment implementation. Another option or alternative is that the user equipment determines the number of required RACH procedures based on the number of timing advance groups to which the plural uplink component carrier belong. As described above, an eNodeB may group component carriers experiencing a similar propagation delay into the same timing advance group. Since the propagation delay of all component carriers within a given timing advance group is equal, only one single timing advance needs to be configures per timing advance group, which means that only one RACH procedure is required per timing advance group for time aligning all component carriers thereof. Accordingly, a user equipment obtaining information on the timing advance groups determines the number of required RACH procedure by performing only one RACH procedure per timing advance group.

Considering a situation where a RACH procedure is required for each timing advance group to which at least one uplink component carrier to be time aligned belongs, the number of required RACH procedures is equal to the number of different timing advance groups of the plurality of uplink component carriers to be time aligned.

A user equipment may set the timing advance of each of the one or more uplink component carriers to be time aligned and belonging to one timing advance group using a timing advance value obtained from eNodeB after performing one single RACH procedure for one of the uplink component carriers to be time aligned of the respective timing advance group.

Considering for exemplary purposes that the user equipment is configured with uplink component carriers that are already time aligned (e.g. a RACH procedure was performed an earlier point in time), a further RACH procedure for acquiring a timing advance value does not need to be performed for those timing advance groups for which a timing advance value is already configured, i.e. for those timing advance groups which comprise one of the already time aligned uplink component carrier. Accordingly, the number of required RACH corresponds to the number of timing advance groups for which no timing advance value is configured, or in other words, the number of required RACH procedures is equal to the number of timing advance groups not comprising an already time aligned uplink component carrier. Regarding the component carriers to be time aligned and that belong to a timing advance group for which a timing advance is already configured, the user equipment simply configures the timing advance of each of the one or more uplink component carriers according to the timing advance set for the respective timing advance group to which the respective component carrier belongs.

As already indicated above, an aspect of the invention is the distribution of the transmit power to the transmissions of the generated transport blocks on the assigned resources on the uplink component carriers. In this context situations where the mobile terminal is power limited are of particular interest. When implementing the invention in a communication system using carrier aggregation in the uplink, like LTE-A, and assuming a per-component carrier power control, another embodiment of the invention is proposing the prioritization of the transmit power allocation on the physical uplink shared channel for the uplink component carriers for cases where the mobile terminal is in a power limited situation. This proposed prioritization of the transmit power available to the mobile terminal is capable of addressing the different QoS of the data/uplink component carriers.

Power limitation denotes the situation where the total transmit power of the mobile terminal that would be required for transmitting the transport blocks on uplink component carriers within a single TTI according to the uplink resource assignments is exceeding the maximum transmit power available to the mobile terminal for uplink transmissions $P_{MAX}$. The maximum transmit power available to the mobile terminal for uplink transmissions $P_{MAX}$ thereby depends on the maximum power capabilities of the mobile terminal and the maximum transmit power allowed by the network (i.e. configured by the eNodeB).

Figure 10:
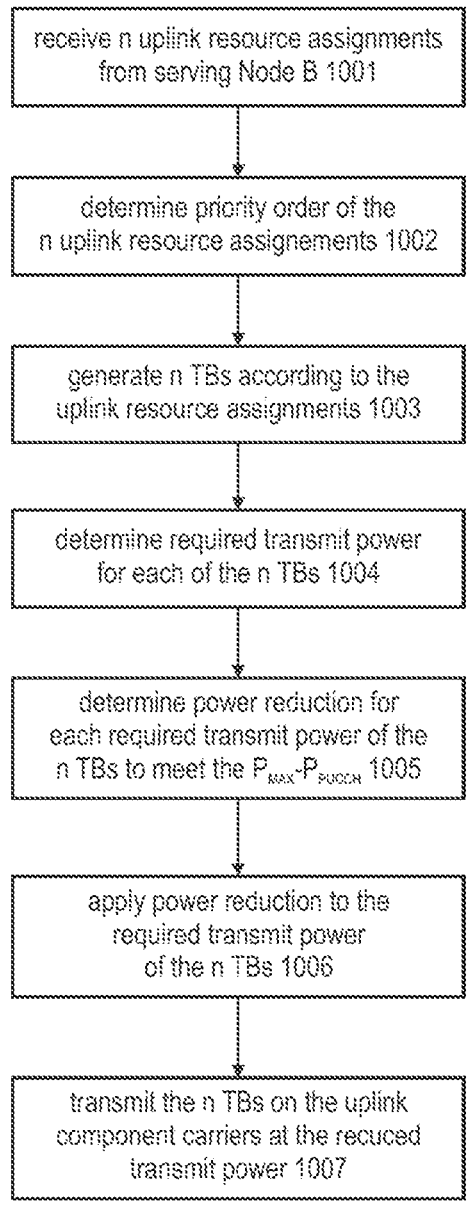
FIG. 10 shows a flow chart of distributing a maximum available transmit power $P_{MAX}$ to the transport blocks to be transmitted within a TTI according to an exemplary embodiment of the invention.
Figure 11:
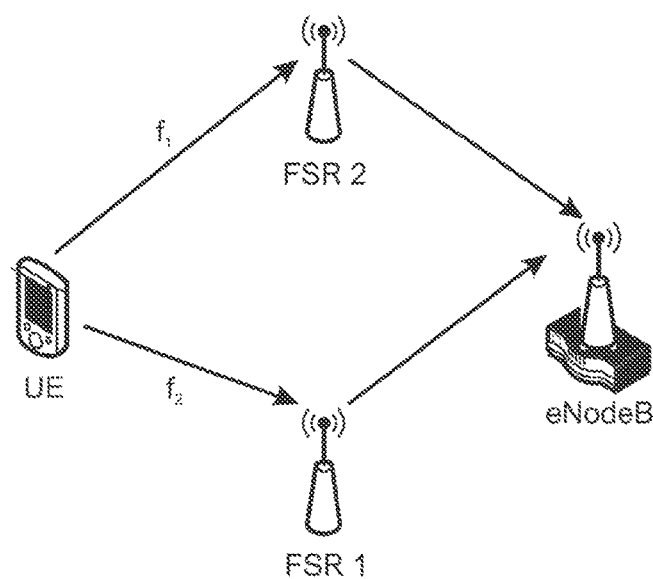
FIG. 11 shows an exemplary scenario in which a user equipments aggregates two radio cells, one radio cell originating from an eNodeB, and the other radio cell originating from a Frequency Selective Repeater (FSR)
Figure 12:
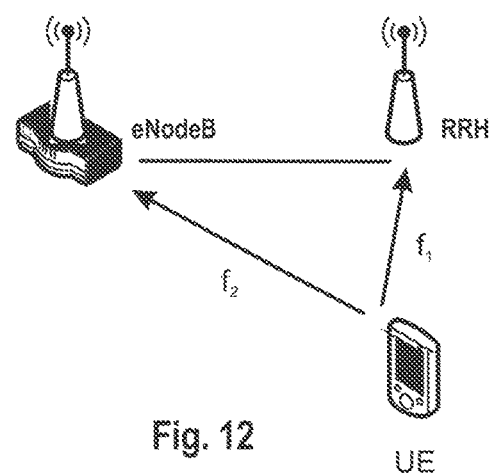
FIG. 12 shows an exemplary scenario in which a user equipments aggregates two radio cells, one radio cell originating from an eNodeB, and the other radio cell originating from a Remote Radio Head (RRH), FIG. 13 exemplifies a different time alignment between a RACH and a PUSCH transmission assuming a timing advance for the PUSCH transmission as defined for 3GPP LTE (Release 8/9), FIG. 14 exemplifies a RACH configuration of a user equipment setup with multiple uplink component carriers, in case the uplink component carriers belong to a same timing advance group, FIG. 15 exemplifies a RACH configuration of a user equipment setup with multiple uplink component carriers, in case the uplink component carriers belong to two timing advance groups.

FIG. 10 shows a flow chart of distributing a maximum available transmit power $P_{MAX}$ to the transport blocks to be transmitted within a TTI according to an exemplary embodiment of the invention. In this exemplary embodiment and the following examples below a LTE-A based communication system using carrier aggregation in the uplink, and assuming a per-component carrier power control will be assumed. Furthermore, it is also assumed that the transmission power of the PUCCH (i.e. the control information) is prioritized over PUSCH transmissions (i.e. the transport blocks generated according to the uplink resource assignments), i.e. PUSCH transmit power is first scaled down in a power limited situation.

The mobile terminal first receives 1001 multiple uplink resource assignments for one TTI using its receiver unit, and a processing unit of the mobile terminal determines 1002 their priority order. The priority order of the uplink resource assignments may be determined according to one of the various exemplary options discussed herein.

Furthermore, the mobile terminal's transport block generation unit generates 1003 the transport blocks according to the uplink resource assignments. This transport block generation may be again implemented according to one of the various exemplary options outlined herein. Furthermore, in another alternative implementation, the transport block for each component carrier may be generated according to the corresponding uplink resource assignment by performing the known LTE Rel. 8 logical channel prioritization for each uplink resource assignment, respectively uplink component carrier.

The mobile terminal's processing unit further determines 1004 for each of the generated transport blocks the transmit power that would be required/implied by their respective uplink resource assignments according to the power control, i.e. required transmission power is given by power control formula. For example, the mobile terminal may use formula (1) as provided in the Technical Background section to determine the transmit power that would be implied for the transmission of each of the transport blocks on the uplink component carriers by the corresponding uplink resource assignment. In this example, the mobile terminal is considered power limited for the transmissions of the transport blocks within the given TTI. The mobile terminal may for example determine its power limitation by comparing the sum of the required transmit powers for the transport blocks to the maximum transmit power available to the mobile terminal for uplink transmissions $P_{MAX}$ minus the transmit power required for control signaling on the PUCCH $P_{PUCCH}$ in the same TTI, and determining thereby that the sum of the required transmit powers for the transport blocks exceeds the maximum transmit power available to the mobile terminal for uplink transmissions $P_{MAX}$ minus the transmit power required for control signaling on the PUCCH $P_{PUCCH}$ in the same TTI.

In order not to exceed the maximum transmit power available to the mobile terminal for uplink transmissions $P_{MAX}$ minus the transmit power required for control signaling on the PUCCH $P_{PUCCH}$ in the same TTI, the mobile terminal needs to reduce the uplink transmit power for the transmission of all or some of the transport blocks. There are several options how this power reduction, also referred to as power scaling, can be implemented done. In the exemplary flow chart shown in FIG. 10, the mobile terminal determines 1005 next a power reduction for each transmission of a respective transport block such that the sum of the reduced transmit power for each transmission of the transport blocks (i.e. the transmit power obtained for each respective transmission of a transport block when applying 1006 the determined respective power reduction to the respective required transmit power as determined in step 1004) becomes equal to or smaller than the maximum transmit power available to the mobile terminal for uplink transmissions $P_{MAX}$ minus the transmit power required for control signaling on the PUCCH $P_{PUCCH}$ in the same TTI. The transmit power control unit of the mobile terminal applies 1006 the determined respective power reduction to the respective required transmit power as determined in step 1004 and transmits 1007 the transport blocks on the assigned uplink resources on the component carriers within the given TTI using the reduced transmit power.

The power reduction or power scaling may be implemented as part of the transmit power control functionality provided by the mobile terminal. The power control functionality may be considered as a function of the physical layer of the mobile terminal. It may be assumed that the physical layer has no idea about logical channel to transport block mapping, respectively the logical channel to component carrier mapping, since the MAC layer of the mobile terminal performs the multiplexing of the logical channel data for multiple component carriers. However, power scaling of the transmissions of the transport blocks (i.e. of the PUSCH) based on uplink component carrier priority (respectively the priority of the uplink resource assignments assigning resources thereon) is desirable to be able to adequately support delay sensitive traffic in a carrier aggregation setting.

More in particular, it is desirable that high QoS data within the transport blocks transmitted on the PUSCH is scaled less compared to low QoS data which can tolerate more retransmissions. Therefore according to one exemplary embodiment of the invention, the power scaling of the transmissions of the transport blocks on the PUSCH (see steps 1005, and 1006) advantageously considers the processing order of the uplink resource assignments, which may be considered equivalent to the priority order of the component carriers on which they assign resources. Since both the processing order of uplink resource assignments as well as the power scaling has an impact on the transmission quality experienced by logical channels, it is desirable to have some interaction between the prioritization of the uplink resource assignments in the transport block generation in the MAC layer of the mobile terminal (see for example step 1003) and the power scaling functionality in the physical layer of the mobile terminal (see steps 1005 and 1006).

This interaction may be for example obtained by the power scaling function provided in the physical layer using the same priority order of the uplink resource assignments for power scaling of PUSCH transmissions as used in the MAC layer for determining the processing order of the uplink resource assignments in the generation of the transport blocks. In one exemplary implementation, the mobile terminal scales down the required transmit powers (see step 1004) for the transport blocks on the PUSCH in the reverse processing order of the uplink resource assignments. Basically the mobile terminal's power control unit starts scaling down the required transmit power for the transmission of the transport block corresponding to the lowest priority uplink resource assignment first, next the terminal's power control unit scales down the required transmit power for the transmission of the transport block corresponding to the second lowest priority uplink resource assignment, etc. If necessary the transmit power of one or more transport blocks may be scaled down to zero, i.e. the mobile terminal performs DTX on the given component carrier(s).

In one further exemplary implementation, the required transmit power for a transmission of the transport block is scaled down to zero, before power scaling the next transport block. Hence, power control unit starts scaling down the required transmit power for the transmission of the transport block corresponding to the lowest priority uplink resource assignment down to zero (if necessary), and if the transmit power needs to be further reduced, the terminal's power control unit scales down the required transmit power for the transmission of the transport block corresponding to the second lowest priority uplink resource assignment again down to zero (if necessary), etc.

The power reduction/scaling of the transmit power may be for example implemented as follows in a LTE-A system. In one exemplary implementation, the eNodeB signals a weight factor $w_c$ for each component carrier c to user equipment that is applied to the PUSCH transmission of a transport block on the respective component carrier. When the user equipment is power limited, its power control unit scales the weighted sum of the transmit power for all PUSCH transmissions on the component carriers on which resources have been assigned. This may be realized by calculating a scaling factor s such that the maximum transmit power available to the mobile terminal for uplink transmissions $P_{MAX}$ is not exceed. The scaling factors can be determined from Formula (2):

$$P_{PUCCH}(i) + s \cdot \sum_c w_c \cdot P_{PUSCH_c}(i) \leq P_{MAX} \qquad (2)$$

where s denotes the scaling factor and $w_c$ the weight factor for component carrier c. $P_{PUCCH(i)}$ denotes the transmit power required for the control signaling on the PUCCH within TTI i, and $P_{PUCCHc}(i)$ denotes the transmit power of a transport block to be transmitted on the PUSCH of component carrier c within TTI i (see step 1004 and formula (1)). Apparently, scaling factors can be determined as:

$$s \leq \frac{P_{MAX} - P_{PUCCH}(i)}{\sum_c w_c \cdot P_{PUSCH_c}(i)} \qquad (3)$$

The weight factor $w_c$ of the component carriers may for example consider the QoS of the data transmitted on a specific component carrier.

In one more advanced implementation, it may be assured that the transport block transmitted on the PUSCH of the uplink PCC is not scaled. This may be for example realized by the eNodeB defining the weight factor $w_c$ for the uplink PCC to 1/s. Alternatively, the following relation may be used to determine the scaling factor s only for component carriers other than the uplink PCC:

$$P_{PUCCH}(i) + P_{PUSCH\_PCC}(i) + s \cdot \sum_c w_c \cdot P_{PUSCH\_SCC_c}(i) \le P_{MAX} \quad (4)$$

so that:

$$s \le \frac{P_{MAX} - P_{PUCCH}(i) - P_{PUSCH\_PCC}(i)}{\sum_c w_c \cdot P_{PUSCH\_SCC_c}(i)} \quad (5)$$

where $P_{PUSCH\_PCC}(i)$ is the transmit power required for the transmission of the transport block to be transmitted on the uplink PCC (see step 1004 and formula (1)), while $P_{PUSCH\_SCC_c}(i)$ is the transmit power required for the transmission of the transport block to be transmitted on other the uplink SCCs (see step 1004 and formula (1)).

In one further exemplary embodiment of the invention, when generating the transport blocks, the user equipment may process the uplink resource assignments in decreasing order of the weight factors $w_c$. Hence, the priority order may be given by the weighting factors $w_c$. The mobile terminal may start processing with the uplink resource assignment for an uplink component carrier which is assigned the highest weight factor $w_c$. Essentially, the highest weight factor $w_c$ corresponds to highest priority uplink component carrier respectively uplink resource assignment in this embodiment.

In case the same weight factor $w_c$ is applied to multiple uplink component carriers, the processing order may be left to user equipment implementation. Alternatively in case of same weight factor $w_c$, the processing order may also be determined based on the downlink transmission timing of the uplink resource assignments (as discussed above) or based on the carrier index (CI) of corresponding component carriers.

In another exemplary embodiment of the invention, the power scaling by the power control unit of the mobile terminal depends on type of a component carrier on which the respective transport block is to be transmitted. The power assignment to the PUSCH transmission of a transport block on the uplink PCC which carries high priority traffic is prioritized over other PUSCH transmissions on the uplink SCC(s). Power allocation, respectively, the amount of power reduction/scaling on other uplink component carriers, i.e. uplink SCC(s), may be left to user equipment implementation. For example, regarding the remaining uplink SCC(s), the user equipment could multiplexes QoS sensitive data on a component carrier of its choice and is allowed to prioritize power allocation of this component carrier relative to other uplink SCC(s).

In a communication system using carrier aggregation, the mobile terminals may also be allowed to perform random access on a component carrier, while transmitting scheduled data (transport blocks) on other component carriers. For a 3GPP based system like LTE-A, it may thus be possible to that the user equipment is performing a random access channel (RACH) access on one component carrier, while transmitting PUSCH/PUCCH simultaneously on other component carriers. The user equipment may thus transmit a RACH preamble, i.e. a transmission on the physical random access channel (PRACH), and in the same TTI also transmit data on the PUSCH and/or PUCCH. A potential use case for concurrent PRACH and PUCCH/PUSCH transmission is the situation where user equipment is out-of-sync on one uplink component carrier, whereas it's still uplink synchronized on other uplink component carrier. In order to regain uplink synchronization for the "out-of-sync component carrier" the user equipment would make a RACH access, e.g. ordered by PDCCH. Furthermore, also in cases where no dedicated scheduling request channel is configured for a user equipment on the PUCCH, the user equipment may perform a RACH access in order to request uplink resources, in case new data is arrived in the UE buffer.

In these cases, according to another embodiment of the invention, the transmit power for the RACH access (i.e. the transmission of the RACH preamble on the PRACH) is not subject power control by the access network. Nevertheless, in this embodiment the transmit power for the PRACH transmission is considered when power scaling is applied by the mobile terminal in power limited situations. Hence, in case of a concurrent PRACH transmission and PUCCH/PUSCH transmission, the transmit powers for PRACH, PUSCH and PUCCH within a TTI should fulfill the relation:

$$P_{PUCCH}(i) + \sum_c P_{PUSCH_c}(i) + P_{PRACH}(i) \le P_{MAX} \quad (6)$$

where $P_{PRACH}(i)$ is the transmit power for the transmission on the PRACH in TTI i, while in case of power scaling being necessary due to power limitation, the following relation may be in one exemplary scenario to be met:

$$P_{PUCCH}(i) + s \cdot \sum_c w_c \cdot P_{PUSCH_c}(i) + P_{PRACH}(i) \le P_{MAX} \quad (7)$$

In a more detailed exemplary implementation, the initial preamble transmission power setting (i.e. the setting of $P_{PRACH}(i)$) may be based on an user equipment's open-loop estimation with full compensation of the path loss. This may ensure that the received power of the RACH preambles is independent of the path-loss. The eNodeB may also configure an additional power offset for the PRACH, depending for example on the desired received SINR, the measured uplink interference and noise level in the time-frequency slots allocated to RACH preambles, and possibly on the preamble format. Furthermore, the eNodeB may optionally configure preamble power ramping so that the transmit power $P_{PRACH}(i)$ for each retransmitted preamble, i.e. in case the PRACH transmission attempt was not successfully, is increased by a fixed step.

There are different alternatives for the power scaling for the case of concurrent PRACH and PUCCH/PUSCH transmission. One option is that the PRACH transmission power $P_{PRACH}(i)$ is prioritized over the PUSCH transmission power $$\sum_c P_{PUSCH_c}(i),$$

similar to the PUCCH transmit power $P_{PUCCH}(i)$. This option is shown in relation (7) above.

Alternatively, another option is to prioritize the PUCCH/PUSCH transmissions over PRACH transmissions. In this case the user equipment would first scale down the transmit power $P_{PRACH}(i)$ of the PRACH and then subsequently scale down the transmit power $$\sum_c P_{PUSCH_c}(i)$$

of the PUSCH (if necessary).

In a third option, no concurrent transmission of PRACH and PUCCH/PUSCH is allowed. Hence, in this case the user equipment drops either the PUCCH/PUSCH transmission or PRACH transmission. Since the timing offset is different between PRACH and PUCCH/PUSCH, the full utilization of the Power Amplifier (PA) is rather difficult.

In other words, a prioritization between the transmit power for a PUSCH transmission and a transmit power for the PRACH transmission (i.e. the transmission of a RACH preamble) defines how a user equipment performs power control when transmitting on different physical channels within a same transmission time interval.

Figure 16:
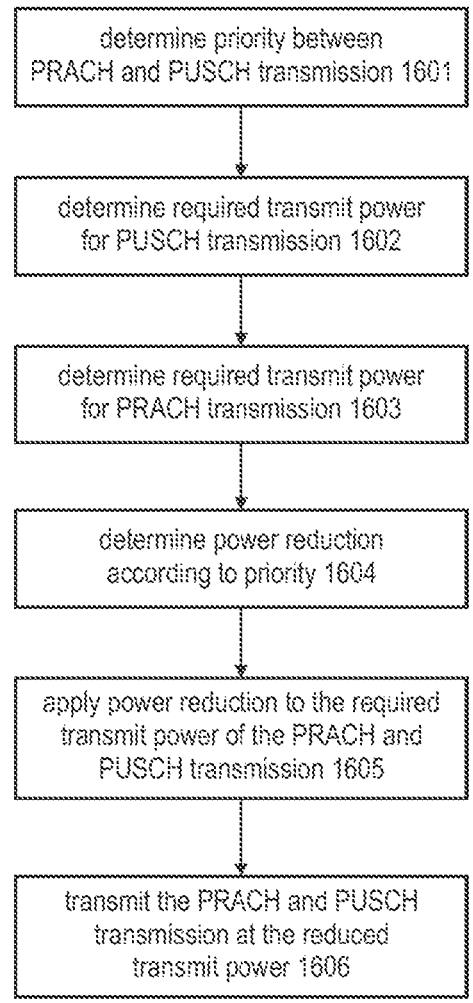
FIG. 16 shows a flow chart of a transmit power adjustment procedure for determining transmit power for PRACH an PUSCH uplink transmissions according to another embodiment of the invention.

According to an embodiment of the invention, a user equipment uses different transmit power levels for simultaneous uplink transmissions via a PRACH and via a PUSCH. By using different power levels, the user equipment may meet a given power constraint, as will be exemplarily illustrated below with reference to the flow chart of FIG. 16.

For adjusting the transmit power utilized by a user equipment for uplink transmissions, the user equipment first determines a priority for PRACH and PUSCH transmissions (see step 1601). Further, the user equipment determines the transmit power for the PUSCH transmission (see step 1602) and for the PRACH transmission (see step 1603) to be performed in the same transmission time interval. In particular, these power levels may be determined based on the uplink component carrier on which each of the transmission is to be performed. It should be apparent that a PRACH and PUSCH transmission to occur in a same sub-frame are to be performed on different uplink component carriers (i.e. by a user equipment supporting carrier aggregation). This user equipment may be an LTE-A user equipment.

Then, the user equipment reduces the determined transmit power for the PUSCH transmission and/or the PRACH transmission (see step 1604). This power reduction is performed according to a prioritization between the transmit power for the PUSCH transmission and the transmit power for the PRACH transmission. By reducing the transmit power according to the maximum available transmit power of the user equipment, the user equipment may be adapted to meet a given power constraint in a power limited situation. Thereafter, the user equipment applies the determine power reduction to determined PRACH and PUSCH transmit power (see step 1605) and transmits the PRACH and PUSCH transmission at the reduced transmit power on the respective uplink component carrier (see step 1606).

A user equipment supporting carrier aggregation may simultaneously perform a RACH access while transmitting PUSCH/PUCCH on other component carriers. In other words, a user equipment may encounter situations where it transmits a RACH preamble, i.e. PRACH transmission, and in the same TTI also transmit PUSCH and/or PUCCH. Simultaneous PRACH and PUCCH/PUSCH transmissions may for example occur in a situation where a user equipment is uplink out-of sync on one component carrier, whereas it's still uplink synchronized on other uplink component carrier. To regain uplink synchronization the user equipment performs a RACH access, e.g. a contention-free RACH access ordered by PDCCH for the component carrier being out-of sync. Furthermore when no dedicated scheduling request channel is configured for a user equipment on PUCCH, the user equipment may also initiate a RACH access in order to request uplink resource, for example in case new data arrives in the user equipment buffer.

In LTE, uplink power control, as described in the Technical Background section herein, is defined for the Physical Uplink Shared Channel (PUSCH), Physical Uplink Control Channel (PUCCH) and the Sounding Reference Signals (SRSs) giving the impression that is not applied for the Physical Uplink Shared Channel (PRACH). Nevertheless, it is necessary to consider PRACH transmission when power scaling needs to be used due to power limitations.

Conventionally, only PUCCH, PUSCH with multiplexed uplink control information (UCI) and PUSCH are considered for the power limitation case, where PUCCH is given the highest priority over PUSCH. A PUSCH transmission having multiplexed UCI is considered of higher priority than a PUSCH transmission without (w/o) multiplexed UCI and is therefore prioritized. This yields the following priority order:

PUCCH>PUSCH with UCI>PUSCH without UCI

Further, the initial power setting for transmission of a RACH preamble may be based on an open-loop estimation with full compensation of the path loss. This would allow ensuring that the received power of the RACH preamble at the eNodeB is independent from the path-loss.

According to a more detailed embodiment of the invention, the eNodeB configures for RACH transmissions an additional power offset to be applied in addition to the power determined from the conventional open-loop power control mechanism. Exemplary implementations for determining the power offset for RACH transmissions may be based on the desired received SINR, on the measured uplink interference and noise level in the time-frequency slots allocated to RACH preambles, and on the preamble format.

According to another detailed embodiment of the invention, the eNodeB may reconfigure the preamble power ramping so that the transmission for each retransmitted preamble, i.e. in case the PRACH transmission attempt was not successfully, is increased by a fixed step.

In other words, there are different solutions to implement the aspect of the invention to perform power scaling for the case of simultaneous PRACH and PUCCH/PUSCH transmission.

According to one implementation of the invention, the PRACH transmission power is prioritized over the PUSCH transmission power, similar to the PUCCH transmit power. This yields the following priority order:

PUCCH>PRACH>PUSCH with UCI>PUSCH without UCI

A further implementation of the invention provides an additional advantage when prioritizing PUSCH with multiplexed UCI over a PRACH transmission. PUSCH with multiplexed UCI include viable time critical information. Accordingly, a respective priority order can be implemented as follows:

PUCCH>PUSCH with UCI>PRACH>PUSCH without UCI

In yet another implementation of the invention PUCCH/PUSCH transmissions are prioritized over PRACH. In this case the user equipment first scales down the transmit power for a PRACH transmission and then subsequently scales down the transmit power for a PUSCH transmission (if necessary). A priority order may be specified as follows:

PUCCH>PUSCH with UCI>PUSCH without UCI>PRACH

The above described implementations of the invention are compatible with different configurations of user equipments. For example, a user equipment may be configured with uplink component carriers belonging to more than one timing advance (TA) group, where the user equipment has only one power amplifier (PA). Alternatively, the user equipment may be configured with plural uplink component carriers belonging to more than one TA group, where for each TA group of uplink component carriers a separate power amplifier (PA) is provided.

In the exemplary configuration of a user equipment operating multiple uplink component carriers belonging to more than one TA group with just one power amplifier (PA), the user equipment has to ensure that no concurrent transmission of PRACH and PUCCH/PUSCH occur. An implementation of such a user equipment would need to drop either PUCCH/PUSCH or PRACH transmission. This is due to the fact that the timing offsets between PRACH and PUCCH/PUSCH are different and, similar to HSUPA's HS-DPCCH and DPCCH/DPDCH case, a full utilization of the Power Amplifier (PA) is rather difficult.

A further embodiment of the invention relates to the prioritization of multiple RACH transmissions within one TTI.

An according implementation of the invention of is a user equipment deciding which of several RACH transmissions is to prioritize based on an order according to the cell index of the corresponding uplink component carriers on which the PRACH preamble shall be transmitted. In this implementation, the highest priority may be assigned to the PRACH transmission on the uplink component carrier with the lowest cell index.

Another implementation of the invention is a user equipment distinguishing between RACH procedures initiated by the user equipment and RACH procedures that are ordered by eNodeB with a PDCCH order (also referred to as contention-free RACH access). In this implementation, RACH procedures ordered by an eNodeB are assigned higher priority than those initiated by the user equipment.

Furthermore, both aforementioned implementations of priority schemes can be combined. In this case the user equipment first ranks RACH procedures based on PDCCH order or UE initiation and then ranks RACH procedures of both groups according to the cell index of corresponding component carriers.

As indicated earlier, it is another detailed embodiment of the invention to reconfigures the RACH preamble power ramping procedure performed by a user equipment so that the transmission for each retransmitted preamble, i.e. in case the PRACH transmission attempt was not successfully, is increased by a fixed step.

In case that user equipment aggregates plural uplink component carriers form more than a single TA group where multiple RACH procedures become necessary. One example may be a handover, where user equipment needs to apply carrier aggregation with activated carriers in the target eNodeB. In this case part of the handover procedure is to time align all TA groups with activated component carriers. If this is done consecutively this introduces additional delay, but also simultaneous RACH procedures increase delay as most likely RACH opportunities on different uplinks in secondary cells will be set slightly apart from each other in order to allow the eNodeB to efficiently manage RACH preamble resources and avoiding too many PRACH transmissions within one TTI.

Another situation where multiple (consecutive) RACH transmissions may occur is when a user equipment is scheduled for data transmissions on several uplink component carriers belonging to different TA groups that are not time aligned (this might be because of inactivity over a longer period).

Furthermore, in another exemplary situation, a user equipment may be required to instantly time align a component carrier upon activation. In this case, when a user equipment receives an activation command for several component carriers belonging to more than one TA group and these TA groups are currently not time aligned, the user equipment needs to perform RACH procedures for all these TA groups simultaneously.

Therefore, according to an exemplary embodiment of the invention, the user equipment may need to perform multiple RACH procedures simultaneously so that the additional delay that would be induced by performing the RACH procedures consecutively is reduced. The aim is to approach the delay time of a single RACH procedure, hence the delay caused by the additional RACH procedures should be minimized.

According to an exemplary implementation, the user equipment increases a transmit power for performing the RACH preamble transmission so as to minimize probability of retransmission.

The PRACH power [dBm] is determined by a user equipment as follows:

$$P_{PRACH_c}(i) = \min\{P_{0\_PRACH} - PL(i) + (N-1)\Delta_{RACH} + \Delta_{preamble}, P_{MAX}\}$$

For finding optimal power setting for $P_{PRACH}$ a user equipment has several options as described below.

One implementation of the invention is to increase $P_{0\_PRACH}$ when multiple uplink component carriers with PRACH opportunity are aggregated by the user equipment, In this context it may be advantageous, if the eNodeB signals different offset values, e.g. a first offset value $P_{0\_PRACH}$ and a second offset value $$P_{0\_PRACH_{multiple}},$$

to user equipment. The two offset values may be configured per user equipment. The first offset value $P_{0\_PRACH}$ may be used when user equipment only aggregates one component carrier with a PRACH opportunity. This would then be the primary cell.

The second offset $$P_{0\_PRACH_{multiple}}$$

has higher power than the first offset $P_{0\_PRACH}$ in order to increase probability to succeed with initial PRACH transmission and to reduce delay that would be introduced when PRACH would have to be retransmitted. The second offset $$P_{0\_PRACH_{multiple}}$$

may be applied in case the user equipment aggregates multiple component carriers and multiple RACH procedures are to be performed.

In this case the user equipment determines PRACH power [dBm] as:

$$P_{PRACH_c}(i) = \min\{P_{0\_PRACH_{multiple}} - PL(i) + (N-1)\Delta_{RACH} + \Delta_{Preamble}, P_{MAX}\}$$

In an alternative implementation to signaling the offset $$P_{0\_PRACH_{multiple}},$$

a user equipment selects a predefined higher value (i.e. the next higher value out of the values possible for preamble-InitialReceivedTargetedPower as specified in section 6.2.2 3GPP TS 36.331, "Evolved Universal Terrestrial Radio Access (E-UTRA); Radio Resource Control (RRC); protocol specification", version 10.0.0, available at http://www.3gpp.org and incorporated herein by reference. This could be the next higher value or a predefined n for selecting the $n^{th}$ higher value.

In another exemplary embodiment, the value of N in above formula is adjusted such that N is already better suited to the current power and path loss situation than starting with an initial value of N=1. In case there has already been a previous RACH procedure on a component carrier, the user equipment reuses the last value of N that has proven successful in the last RACH preamble transmission to make the initial preamble transmission in the current RACH procedure on that component carrier instead of using the initial value of 1. In case there was no previous RACH procedure on that component carrier user equipment may start with using the initial value of 1. This implementation can also be used when there is only a single component carrier that offers RACH opportunities.

A further exemplary embodiment of the invention, considers the selection of the value of N in a situation where the PRACH procedure on an uplink component carrier is the first PRACH procedure on that uplink component carrier, but the user equipment has already performed a previous PRACH procedure on another uplink component carrier. In this case the user equipment may use the last successful value of N on another component carrier and applies it for determining the initial PRACH power for the component carrier with the initial RACH procedure.

Alternatively, since the user equipment always performs a first PRACH access on the primary component carrier (i.e the primary cell, PCell) the user equipment may be configured to always refer to the value of N from the last successful PRACH transmission on the primary component carrier (PCell) for use as the initial value of N for another PRACH access on a different component carrier.

The utilization of N, as described above, may be beneficial in that no additional parameters need to be specified and user equipment still applies a simple rule for determining an improve transmit power setting for performing a PRACH procedure. Furthermore, when the user equipment is implemented to use the value of N from the last successful PRACH transmission on the same component carrier power levels for each component carrier, each RACH opportunity may be individually adjusted by combining it with the different implementation as previously presented or presented in the following.

Another implementation according to a further embodiment of the invention may include adjusting the power level for the initial PRACH transmission by introducing an initial parameter $\Delta$offset to be added to the original formula for determining the PRACH transmit power [dBm ] as follows:

$$P_{PRACH_c}(i) = \min\{P_{0\_PRACH}-PL(i)+(N-1)\Delta_{RACH}+\Delta_{Preamble}+\Delta\text{offset}_c, P_{MAX}\}$$

In this context, the value $\Delta$offset$_c$ can be individually configured by the eNodeB for each aggregated component carrier c with RACH opportunity. Accordingly, the eNodeB may control the initial RACH power to be performed by user equipments for each TA group separately. Alternatively, it could be advantageous to provide a first offset $\Delta$offset$_{PCell}$ for use with RACH procedures on the primary component carrier (PCell) and another offset $\Delta$offset$_{SCell}$ for RACH procedures on the secondary cells (SCells). Further, there is also the possibility to form groups of component carriers with PRACH opportunity that use the value of $\Delta$offset which has previously proven successful.

It is important to note that, unless specified otherwise, all of the above described implementations can also be used in combination.

As described above, currently a RACH procedure is initiated on eNodeB order (i.e. eNodeB is sending a PDCCH containing a command for UE to initiate RACH procedure), for instance, upon data arrival in the user equipment that should be sent in the uplink when the uplink carrier is not time aligned or during handover.

According to another embodiment of the invention, a new trigger for initiating RACH procedure allows reduction of the overall delay of RACH procedures, when multiple RACH procedures are possible on the aggregated component carriers in one user equipment. This trigger is implemented as an activation command for a component carrier that belongs to a TA group which is currently not time aligned. Upon reception of a MAC CE containing the activation command, a user equipment sends an acknowledgement (ACK) message in the uplink and waits for a predefined number of sub-frames (e.g. two sub-frames) before initiating a RACH procedure. At this point in time the eNodeB has received the ACK and inherently knows that a user equipment will initiate a RACH procedure. Consequently, the component carrier activation command as transmitted by the eNodeB may serve as a trigger for starting RACH procedure. Thereby the overall delay of RACH procedures reduces, save the time of an additional PDCCH transmission that the eNodeB would have sent to user equipment for ordering RACH procedure. As a result, a RACH procedure can start earlier and the delay is reduced, In a further exemplary embodiment of the invention, the user equipment is configured to trigger performing a RACH procedure for all currently unaligned TA groups upon arrival of the uplink data in the user equipment. Such a trigger for performing RACH procedures for all currently unaligned TA groups enables the eNodeB to quickly schedule all activated uplink carriers in the user equipment.

An alternative embodiment of the invention suggests that a user equipment is configured to only perform RACH procedures on secondary component carriers (i.e. on component carriers other than the primary component carrier (PCell)) in response to a PDCCH order. In other words, the user equipment is not allowed to perform a RACH procedure on a secondary component carrier (SCell) on it's own volition. This may be advantageous since eNodeB has full control over RACH procedures on secondary component carriers (SCells) in a user equipment due to the eNodeB being able to determine an exact point in time and the component carrier on which the user equipment starts a RACH procedure.

As already indicated above, another aspect of the invention is the transmit power adjustment for random access (RACH) procedures based on the number of RACH procedures required for time aligning plural uplink component carriers.

Timing advance groups have been introduced to group uplink component carriers that experience a similar propagation delay. As a result, an eNodeB is enabled to control a timing advance of all uplink component carriers belonging to a same group. For this purpose, the eNodeB could utilize a single RACH mechanism for initial time alignment, i.e. by performing the Initial Timing Advance Procedure, and thereafter subsequently sends timing advance (TA) update commands via MAC control elements (MAC CEs).

Regarding the implementation of the matching between a MAC control element including the TA update command and the respective timing advance (TA) group there may be several options. For example, the matching between TA groups and MAC control elements including the TA update command could be left to the user equipment implementation. Alternatively, an indicator could be provided within the MAC control element allowing the user equipment to identify the respective TA group from a received MAC control element comprising the TA update command. Yet another alternative would require the eNodeB to transmit the MAC control element including the TA command on at least one of the downlink component carriers belonging to a respective TA group.

Figure 8:
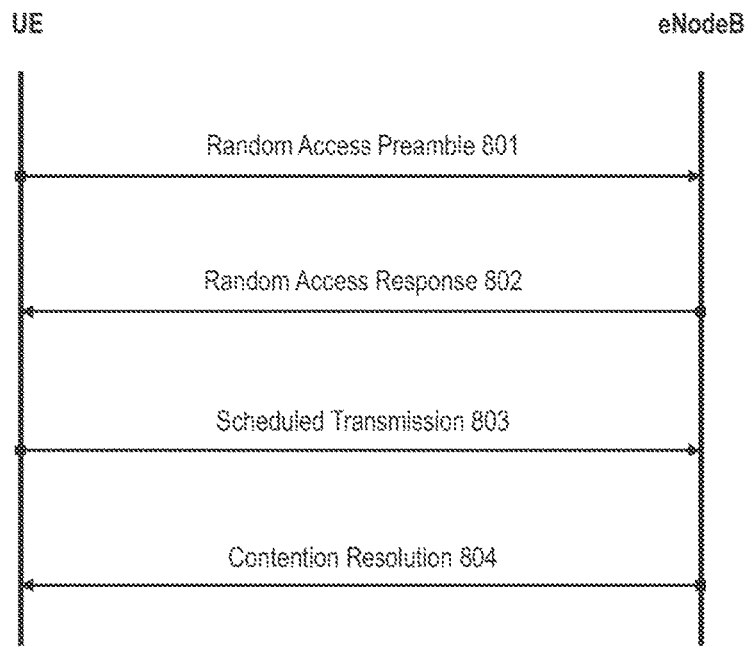
FIG. 8 shows a RACH procedures as defined for 3GPP LTE (Release 8/9) in which contentions may occur.
Figure 9:
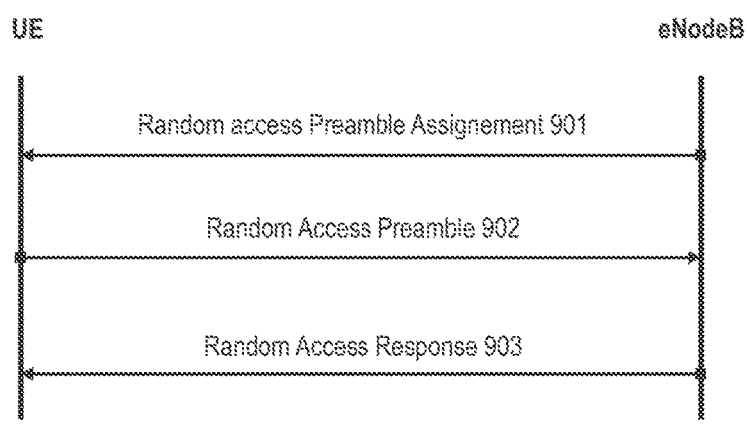
FIG. 9 shows a contention-free RACH procedure as defined for 3GPP LTE (Release 8/9)

However, even with the implementation of TA groups, the user equipment may be bound by restrictions resulting from the definition of the random access (RACH) procedure. As already indicated above, a RACH procedure requires processing resources and introduces restrictions on uplink transmissions that can be performed in parallel by a mobile terminal. In particular, the restrictions on uplink transmissions that can be performed in parallel result from a different time alignment between a PRACH uplink transmission (e.g. the transmission of random access preamble in steps 801 and 902 as shown in FIGS. 8 and 9) and PUSCH transmissions as exemplary shown in FIG. 13.

Figure 13:
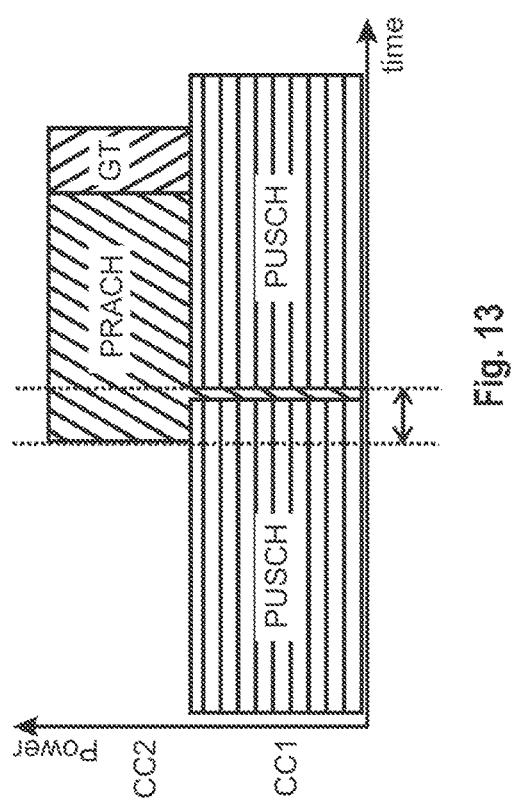

In more detail, PRACH transmissions and PUSCH or PUCCH transmissions use different uplink timing advance (PRACH transmissions are always aligned to the downlink reception timing, where the timing advance (TA) is 0, whereas PUSCH and PUCCH transmissions are only allowed on an uplink component carrier when the uplink component carrier is time aligned, where the timing advance (TA) is larger than 0). Furthermore, for PRACH transmissions a different guard time duration is applied. Accordingly, difficulties in regulating an overall transmission power and power fluctuations in transmit power may occur if PUSCH/PUCCH transmissions and PRACH transmissions are to be transmitted simultaneously via the same power amplifier. FIG. 13 is illustrates an exemplary situation in which different timings are applied to the PRACH and the PUCCH/PUSCH transmissions.

To avoid misalignment causing power fluctuations, simultaneous uplink transmissions should be avoided on uplink component carriers with different timing advance values via a same power amplifier. An exemplary implementation of a user equipment meeting the above constraint would have to ensure that all uplink transmissions via a power amplifier were on uplink component carriers belonging to a same timing advance (TA) group, hence, employing a same timing advance value which would, therefore, imply time synchronous uplink transmissions. The exemplary user equipment implementation would also have to refrain from utilizing this power amplifier for uplink transmissions on uplink component carriers with a different timing advance.

Consequently, each timing advance (TA) group is assigned in a user equipment with a separate "own" power amplifier.

This means, that according to an embodiment of the invention for time aligning one or more uplink component carriers, only a required number of RACH procedures are performed, wherein a transmit power for performing all of the one or more RACH procedures is determined according to the number of required RACH procedures.

Figure 17:
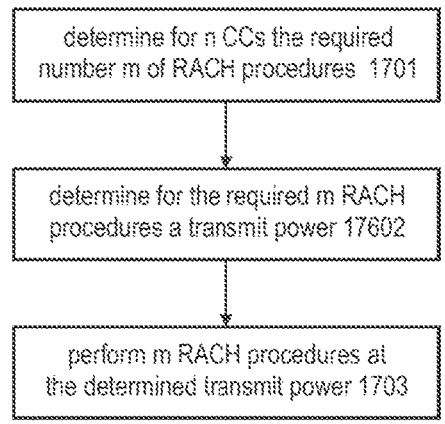
FIG. 17 shows a flow chart of a transmit power adjustment procedure for multiple RACH procedures according to yet another embodiment of the invention.

FIG. 17 shows a flow chart corresponding to this embodiment of the invention. As shown in FIG. 17, a user equipment is configured with uplink component carriers to be time aligned. Before performing any RACH procedure, the user equipment determines (see step 1701) how many RACH procedures are required for utilizing the provide number of power amplifiers in an advantageous manner meeting the above described RACH constraints. Assuming the number of required RACH procedures to be lower than the number of uplink component carriers to be time aligned, the user equipment saves energy and limits the use of processing resources.

Having determined the number of RACH procedures required, the user equipment determines a transmit power for the RACH preambles of the RACH procedures (see step 1702). Thereafter, the user equipment performs the required RACH procedures at the determined transmit power for time aligning the uplink component carriers (see step 1703).

In an exemplary implementation, the user equipment determines a transmit power for the RACH preambles sent in the required RACH procedures reutilizing the saved energy from step 1701. In more detail, dividing a total amount of available transmit power by a smaller number RACH procedures required (assuming that the number of required RACH procedures is indeed smaller than the number of uplink component carriers to be time aligned) allows the user equipment to perform each RACH procedure with a higher transmit power.

According to another exemplary implementation, the user equipment determines the transmit power for all required RACH procedures switching between offset $P_{0\_PRACH}$ and $$P_{0\_PRACH_{multiple}}.$$

Utilizing the first offset $P_{0\_PRACH}$ when determining the transmit power for performing a RACH procedure, in case one RACH procedure is required and utilizing the second, higher valued offset $$P_{0\_PRACH_{multiple}},$$

in case multiple RACH procedures are required, allows the user equipment to improve the success probability when performing each RACH procedure and reducing the delay introduced by the RACH procedures.

According to yet another exemplary implementation, the user equipment also determines the transmit power for all required RACH procedures switching between offset $P_{0\_PRACH}$ and $$P_{0\_PRACH_{multiple}}.$$

However, in this exemplary implementation, the user equipment utilizes the first offset $P_{0\_PRACH}$ when determining the transmit power for performing a RACH procedure on the primary component carrier (PCell), and utilizes the second, higher valued offset $$P_{0\_PRACH_{multiple}}$$

for RACH procedures on the secondary component carriers (SCells). As there may be more than one secondary cell (SCell) an increase in transmit power for performing RACH procedures on secondary cells improves the success probability and, hence, reduces the delay introduced by the RACH procedures.

Figure 18:
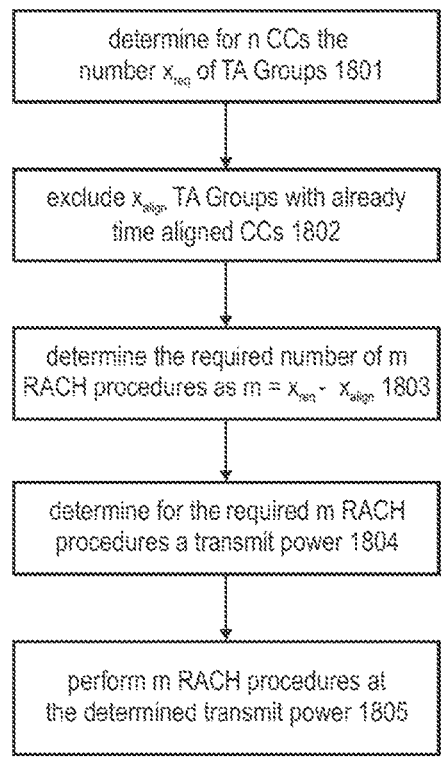
FIG. 18 shows a flow chart of a transmit power adjustment procedure for multiple RACH procedures according to an exemplary implementation of the embodiment of FIG. 17 of the invention.

In a more detailed embodiment of the invention illustrated in FIG. 18, the user equipment determines the number of required RACH procedures based on the number of TA groups to which the uplink component carriers belong and on the TA groups with already time aligned uplink component carriers.

First, the user equipment determines for time aligning one or more uplink component carriers the number of TA groups to which the uplink component carriers belong (see step 1801). Thereby, the user equipment can ensure that at most one RACH procedure is performed for each TA group. In case the user equipment is not time aligned with any uplink component carrier, the number of RACH procedures performed is equal to the number of TA groups to which the uplink component carriers belong.

Second, the user equipment excludes TA groups with already time aligned uplink component carriers (see step 1802). In more detail, the user equipment excludes from a list of TA groups (e.g. $x_{req}$ TA groups) to which the uplink component carriers belong those TA groups (e.g. $x_{align}$ TA groups) to which already time aligned uplink component carrier belong. In an implementation of this embodiment of the invention, a user equipment is configured to reuse the timing advance value from an already time aligned uplink component carrier for time aligning different uplink component carriers of the same TA group.

Third, the user equipment determines the number of required RACH procedures as the number of TA groups to which the uplink component carriers to be time aligned belong minus the number of TA groups to which already time aligned uplink component carrier belong m=$x_{req}$-$x_{align}$ (see step 1803). Excluding TA groups to which already time aligned uplink component carrier belong, results in a number of required RACH procedures and a list of TA groups, to which at least one of the uplink component carriers belongs and where the user equipment does not have a timing alignment. In other words, the number of required RACH procedures corresponds to the minimum of RACH procedures to be performed for time aligning the uplink component carriers without making any assumptions on preconfigured or correlated timing advance for uplink component carriers.

Thereafter, the user equipment determines a transmit power for performing the required number of m RACH procedures (see step 1804). This step corresponds to step 1702 of FIG. 17 and may be realized by the same implementations as suggested with respect to FIG. 17.

Then, the user equipment performs the required m RACH procedures at the determined transmit power for time aligning the uplink component carriers (see step 1703)

Considering the above restrictions, one advantageous implementation of the user equipment of the invention a limits the random access preamble transmissions to only one per timing advance group so that only one PRACH preamble transmission is allowed for the uplink component carriers belonging to a same timing advance group. On which of the one or more uplink component carriers belonging to a same TA group the user equipment performs a RACH procedure may be configured by the eNodeB. Another alternative implementation may leave the selection of uplink component carrier performing the RACH procedure to the user equipment, wherein the user equipment chooses one of the uplink component carriers belonging to one TA group to transmit PRACH preambles.

Figure 14:
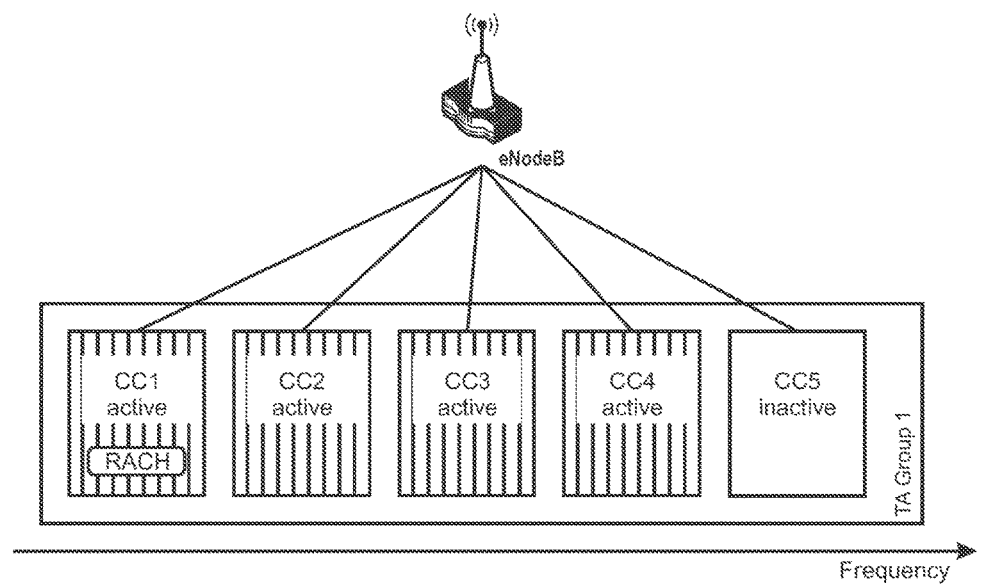

FIG. 14 shows an exemplary configuration where a user equipment has aggregated five uplink component carriers among which four uplink component carriers are activated. All uplink component carriers belong to a same TA group, i.e. are subject to a similar propagation delay. In this exemplary configuration, a RACH procedure is performed on the first uplink component carrier (which may correspond to the primary component carrier/PCell). This exemplary configuration is compliant with carrier aggregation as described in Release 10 of the 3GPP standard.

Figure 15:
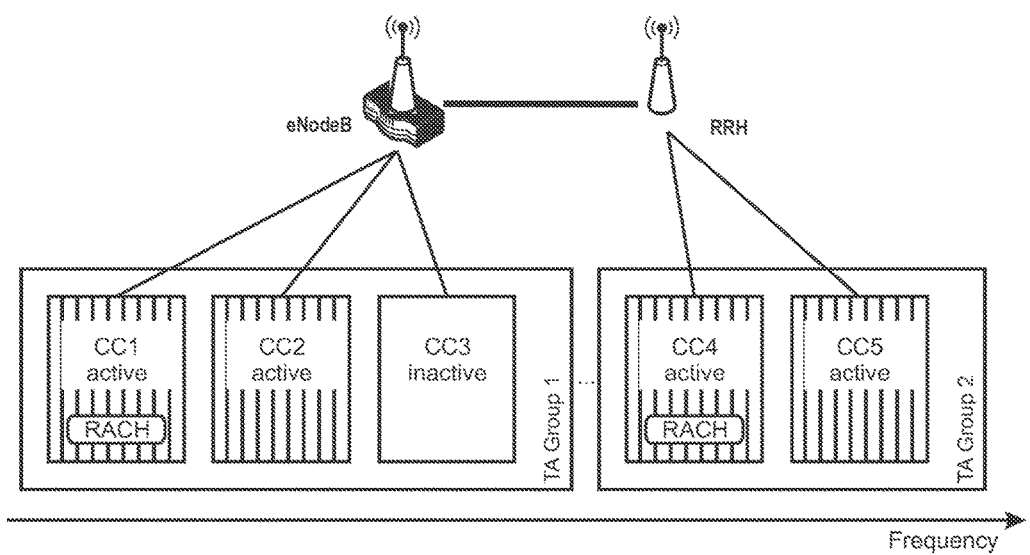

FIG. 15 shows an exemplary configuration where a user equipment aggregates uplink component carriers from different geographical locations (e.g from an eNodeB and a Remote Radio Head) and different frequency bands. The eNodeB provides uplink component carriers 1, 2 and 3 and groups the uplink component carriers 1, 2 and 3 in timing advance group 1. Uplink component carriers 1, 2 and 3 experience a similar propagation delay. Remote Radio Head provides uplink component carriers 4 and 5 at a different geographic position and on a different frequency band. These component carriers experience a different propagation delay compared to the first three component carriers. To comply with these propagation delay differences, uplink component carriers 4 and 5 are supplied with a different timing advance and grouped in timing advance group 2.

Each of the timing advance groups 1 and 2 is associated with a different power amplifier to meet the constraints in terms of allowed RACH procedures as described above.

In the timing advance group 1 with the primary component carrier/PCell, RACH procedure is allowed on the primary component carrier/PCell and in the other timing advance group 2 any uplink component carrier could offer opportunities to send RACH preamble. Accordingly, an exemplary implementation of the embodiment is that the user equipment to choose one of the uplink component carriers of the timing advance group on which RACH procedures are performed. An alternative implementation of this embodiment adapts the eNodeB so that the eNodeB can configure on which of the uplink component carriers the user equipment performs RACH procedures. In the exemplary configuration shown in FIG. 15 uplink component carrier 4 is used by the user equipment for performing RACH procedures.

In the examples above, a bandwidth aggregation scenario has been assumed, where the mobile terminal receives multiple uplink resource assignments for different component carriers within the same TTI. The concept of introducing a priority respectively priority order for uplink assignments can be equally applied for the case of spatial multiplexing. Spatial multiplexing denotes a MIMO technique or MIMO transmission mode, where more than one transport block can be transmitted at the same time and on the same frequency using multiple reception and transmission antennas. Separation of the different transport blocks is done by means of signal processing at the receiver and/or transmitter side. Essentially the transport blocks are transmitted on different MIMO channels respectively MIMO layers but on the same component carrier.

Using spatial multiplexing—which is considered for LTE-A uplink—the uplink resource assignments allocate an uplink resource for MIMO layers on a component carriers. Hence, there may be multiple uplink resource assignments for individual MIMO layers on one component carrier. Similar to the introduction of a priority order for component carriers, also for MIMO scenarios a priority or priority order of the uplink resource assignments for the MIMO layers is used in the generation of the transport blocks. The priority order of the MIMO layers could be pre-configured (e.g. during radio bearer establishment) or could be signaled by physical layer, MAC or RRC signaling as mentioned previously.

Hence, assuming a single component carrier system—such as LTE Rel. 8—the uplink resource assignments for the individual MIMO layers of the component carrier could be accumulated to a virtual transport block and a joint logical channel procedure could be performed on the virtual transport block as described before. The content of the virtual transport block needs to be then divided to the individual transport blocks according to the priority order of their assignments and the transport blocks are transmitted via the respective antennas of the mobile terminal.

Similarly also a parallelization of joint logical channel procedures is possible, by operating on transport blocks, respectively uplink resource assignments for MIMO layers instead of transport blocks, respectively uplink resource assignments for component carriers.

Furthermore, the concepts of the invention outlined herein may also be used in systems that provide bandwidth aggregation (i.e. multiple component carriers are configured) and spatial multiplexing. In this case the uplink resource assignment grants a resource on the uplink for transmitting a transport block on a given MIMO layer and component carrier. Also for this system design the joint logical channel procedures can be used in a similar fashion as discussed above.

In this context, please note that there may be a "joint" priority order for uplink resource assignments on a per MIMO layer and per component carrier basis, or alternatively, there may be separate priority orders, i.e. a priority order for MIMO layers (independent from the component carriers) and a priority order for the component carriers (independent from the component carriers). Third, there is also the possibility that spatial multiplexing is used but MIMO layers are assumed to be equal priority (so that there is no priority order for MIMO layers), however there is a priority order for the component carriers.

In the first case, where there is a "joint" prioritization based on MIMO layer and component carrier, the (joint) logical channel prioritization procedures can be reused to generate the transport blocks for the individual component carriers and MIMO layers.

In the second and third case, according to an embodiment of the invention, the uplink resource assignments of the MIMO layers are first accumulated (e.g. according to the MIMO layer priorities, if available) per component carrier, and subsequently the obtained virtual transports blocks of the component carriers are accumulated according to their priority order to perform a (joint) logical channel prioritization on the virtual transport block obtained from the component carrier-wise accumulation.

When having filled the virtual transport block obtained from the component carrier-wise accumulation with data of the logical channels, same is again divided in virtual transport blocks per component carrier, and subsequently the virtual transport blocks per component carrier are further divided into individual transport blocks for the respective MIMO layers in each component carrier.

In a further embodiment of the invention, in the third case where there is no priority order of the MIMO layers, there may be one uplink resource assignment sent per component carrier that covers all MIMO layers. Accordingly, in this case the accumulation of uplink grants for the MIMO layers in the procedure above can be omitted. Nevertheless, the virtual transport blocks per component carrier obtained by division needs to be further divided to transport blocks for the MIMO layers in each component carrier—e.g. assigning equal shares of the virtual transport blocks per component carrier to each MIMO layer for transmission.

In some embodiment of the invention, the concepts of the invention have been described with respect to an improved 3GPP LTE system, where there is one component carrier configured on the air interface. The concepts of the invention may also be equally applied to a 3GPP LTE-A (LTE-A) system presently discussed in the 3GPP.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. An integrated circuit for controlling operation of a communication apparatus, the integrated circuit comprising:
control circuitry which, in operation:
determines, for each subframe, power for physical uplink shared channel (PUSCH) transmission on a first component carrier which belongs to a first timing advance group (TAG), and determines power for physical random access channel (PRACH) transmission on a second component carrier which belongs to a second TAG, the second TAG being different from the first TAG; and
adjusts, when a total transmission power exceeds a maximum output power configured for the communication apparatus $P_{MAX}$, the power for PUSCH transmission so that the total transmission power after the adjustment does not exceed $P_{MAX}$ on an overlapped portion of the PUSCH transmission on a first subframe of the first component carrier and PRACH transmission on a second subframe of the second component carrier, the second subframe being a subframe with a time offset from the first subframe along a time axis, wherein the power for PRACH transmission is kept unadjusted; and
at least one output coupled to the control circuitry, which, in operation:
outputs a transport block for transmission over the PUSCH of the first component carrier at the adjusted power for PUSCH transmission, and
outputs a random access preamble for transmission over the PRACH of the second component carrier at the determined power for PRACH transmission.

2. The integrated circuit according to claim 1, wherein when the PUSCH is simultaneously transmitted with a physical uplink control channel (PUCCH),
the control circuitry, in operation:
determines power for PUCCH transmission; and
adjusts at least one of the power for PUSCH transmission and the power for PUCCH transmission.

3. The integrated circuit according to claim 2, wherein the control circuitry adjusts only the power for PUSCH transmission.

4. The integrated circuit according to claim 1, wherein the PRACH transmission is initiated by a PDCCH order.

5. The integrated circuit according to claim 1, wherein when transmission of the random access preamble is not requested and a physical uplink control channel (PUCCH) is transmitted simultaneously with the PUSCH,
the control circuitry, in operation:
sets the power for PRACH transmission to zero and further determines power for PUCCH transmission on the first component carrier; and
adjusts the power for PUSCH transmission so that the adjusted total transmission power does not exceed $P_{MAX}$.

6. The integrated circuit according to claim 1, wherein the power for PUSCH transmission is adjusted per subframe.

7. The integrated circuit according to claim 1, wherein when a plurality of PUSCHs are configured on the first component carrier, the control circuitry adjusts the power for PUSCH transmission by reducing respective powers for the plurality of PUSCHs.

8. The integrated circuit according to claim 1, wherein the control circuitry adjusts the total transmission power in a priority order of the PRACH, the PUCCH and the PUSCH.

* * * * *